United States Patent
Xu et al.

(10) Patent No.: US 10,588,065 B2
(45) Date of Patent: *Mar. 10, 2020

(54) METHOD AND APPARATUS FOR PERFORMING INTER-MENB HANDOVER WITHOUT SENB CHANGE IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/255,732

(22) Filed: Jan. 23, 2019

(65) Prior Publication Data
US 2019/0159093 A1  May 23, 2019

Related U.S. Application Data

(63) Continuation of application No. 15/541,328, filed as application No. PCT/KR2015/014378 on Dec. 29, 2015, now Pat. No. 10,225,779.
(Continued)

(51) Int. Cl.
*H04W 36/18* (2009.01)
*H04W 36/30* (2009.01)
(Continued)

(52) U.S. Cl.
CPC ....... *H04W 36/18* (2013.01); *H04W 36/0033* (2013.01); *H04W 36/0055* (2013.01);
(Continued)

(58) Field of Classification Search
CPC ..... H04W 76/15; H04W 36/30; H04W 76/19; H04W 36/0055; H04W 92/20; H04W 36/08
See application file for complete search history.

(56) References Cited

U.S. PATENT DOCUMENTS 9,363,781 B2   6/2016  Won et al.
9,730,152 B2 *  8/2017  Lin ........................ H04W 48/20
(Continued)

FOREIGN PATENT DOCUMENTS

CN    104105108    10/2014
CN    104219722    12/2014
(Continued)

OTHER PUBLICATIONS

United States Patent and Trademark Office U.S. Appl. No. 15/314,757, Final Office Action dated Aug. 24, 2018, 23 pages.
(Continued)

*Primary Examiner* — Asghar H Bilgrami
(74) *Attorney, Agent, or Firm* — Lee, Hong, Degerman, Kang & Waimey PC

(57) ABSTRACT

A method and apparatus for performing an inter-master eNodeB (MeNB) handover procedure without secondary eNB (SeNB) change in a wireless communication system is provided. A source MeNB transmits a handover request message including a first indication of a SeNB to a target MeNB. The first indication may correspond to a SeNB identifier (ID). Upon receiving the handover request message including the first indication, the target MeNB transmits a SeNB addition request message including a second indication of a UE, served by the SeNB, to the SeNB. The second indication may correspond to an old SeNB UE X2AP ID, which was allocated by the SeNB. Upon receiving the SeNB addition request message including the second indication, the SeNB may transmit a SeNB addition acknowl-
(Continued)

edge message including a third indication of keeping bearers of the SeNB from the SeNB.

12 Claims, 26 Drawing Sheets

Related U.S. Application Data

(60) Provisional application No. 62/098,295, filed on Dec. 30, 2014, provisional application No. 62/102,101, filed on Jan. 12, 2015, provisional application No. 62/157,978, filed on May 7, 2015, provisional application No. 62/158,547, filed on May 8, 2015, provisional application No. 62/160,622, filed on May 13, 2015.

(51) Int. Cl.
| | |
|---|---|
| *H04W 36/08* | (2009.01) |
| *H04W 76/15* | (2018.01) |
| *H04W 76/19* | (2018.01) |
| *H04W 88/08* | (2009.01) |
| *H04W 92/20* | (2009.01) |
| *H04W 36/00* | (2009.01) |
| *H04W 88/06* | (2009.01) |

(52) U.S. Cl.
CPC ......... *H04W 36/08* (2013.01); *H04W 36/30* (2013.01); *H04W 76/15* (2018.02); *H04W 92/20* (2013.01); *H04W 36/0069* (2018.08); *H04W 76/19* (2018.02); *H04W 88/06* (2013.01); *H04W 88/08* (2013.01)

(56) References Cited

U.S. PATENT DOCUMENTS

| | | | |
|---|---|---|---|
| 10,278,103 B2 | 4/2019 | Xu et al. | |
| 2007/0213060 A1 | 9/2007 | Shaheen | |
| 2009/0129335 A1 | 5/2009 | Lee et al. | |
| 2011/0075675 A1 | 3/2011 | Koodli et al. | |
| 2012/0188948 A1 | 7/2012 | Brombal | |
| 2012/0188984 A1 | 7/2012 | Takahashi et al. | |
| 2013/0242907 A1 | 9/2013 | Kang et al. | |
| 2014/0004863 A1 | 1/2014 | Zhang et al. | |
| 2014/0160940 A1* | 6/2014 | Maehara | H04W 28/08 370/237 |
| 2014/0177600 A1 | 6/2014 | Tsai et al. | |
| 2014/0192740 A1 | 7/2014 | Ekpenyong et al. | |
| 2014/0192775 A1 | 7/2014 | Li et al. | |
| 2014/0293958 A1* | 10/2014 | Teyeb | H04W 36/24 370/331 |
| 2014/0308955 A1 | 10/2014 | Won et al. | |
| 2014/0364128 A1 | 12/2014 | Lee et al. | |
| 2015/0111580 A1* | 4/2015 | Wu | H04W 36/0005 455/436 |
| 2015/0230107 A1 | 8/2015 | Chiba et al. | |
| 2015/0341984 A1 | 11/2015 | Wang et al. | |
| 2015/0350969 A1* | 12/2015 | Dudda | H04W 36/0005 370/331 |
| 2016/0044743 A1 | 2/2016 | Xu et al. | |
| 2016/0135103 A1* | 5/2016 | Lee | H04W 28/08 455/444 |
| 2016/0192245 A1* | 6/2016 | He | H04W 36/0033 370/331 |
| 2016/0242092 A1* | 8/2016 | Rosa | H04W 36/0016 |
| 2016/0337924 A1* | 11/2016 | Ohta | H04L 5/00 |
| 2016/0337925 A1* | 11/2016 | Fujishiro | H04W 16/32 |
| 2017/0134998 A1 | 5/2017 | Xu et al. | |
| 2017/0374591 A1 | 12/2017 | Xu et al. | |

FOREIGN PATENT DOCUMENTS

| | | |
|---|---|---|
| EP | 2978261 | 1/2016 |
| EP | 3035735 | 6/2016 |
| EP | 3101949 | 12/2016 |
| EP | 3167657 | 5/2017 |
| KR | 1020140145524 | 12/2014 |
| WO | 2014/112803 A1 | 7/2014 |
| WO | 2014103145 | 7/2014 |
| WO | 2014113190 | 7/2014 |
| WO | 2014148874 | 9/2014 |
| WO | 2014/171715 A1 | 10/2014 |
| WO | 2014169841 | 10/2014 |
| WO | 2014/177090 A1 | 11/2014 |
| WO | 2016006969 | 1/2016 |

OTHER PUBLICATIONS

U.S. Appl. No. 15/314,757, Office Action dated Feb. 9, 2018, 70 pages.
PCT International Application No. PCT/KR2015/014378 International Search Report dated Apr. 12, 2016, 2 pages.
European Patent Office Application Serial No. 15875654A, Search Report dated May 16, 2018, 15 pages.
Huawei, "MeNB Mobility Procedure", 3GPP TSG RAN WG3 Meeting #83, R3-140117, Feb. 2014, 5 pages.
U.S. Appl. No. 15/541,328, Notice of Allowance dated Oct. 12, 2018, 15 pages.
PCT International Application No. PCT/KR2015/014386, International Search Report dated Apr. 4, 2016, 3 pages.
Kyocera, "Handover enhancements with dual connectivity", 3GPP TSG RAN WG2 Meeting #85, R2-140698, Feb. 2014, 10 pages.
Nsn et al., "SeNB change and inter-MeNB handover procedure", 3GPP TSG RAN WG3 Meeting #83, R3-140424, Feb. 2014, 10 pages.
The State Intellectual Property Office of the People's Republic of China Application Serial No. 201580071712.5, Office Action dated Aug. 28, 2019, 8 pages.
The State Intellectual Property Office of the People's Republic of China Application Serial No. 201580071956.3, Office Action dated Sep. 4, 2019, 9 pages.
European Patent Office Application Serial No. 19190664.3, Search Report dated Sep. 11, 2019, 9 pages.
United States Patent and Trademark Office U.S. Appl. No. 16/299,902, Office Action dated Sep. 18, 2019, 17 pages.

* cited by examiner

METHOD AND APPARATUS FOR PERFORMING INTER-MENB HANDOVER WITHOUT SENB CHANGE IN WIRELESS COMMUNICATION SYSTEM

CROSS-REFERENCE TO RELATED APPLICATIONS

This application is a continuation of U.S. application Ser. No. 15/541,328, filed on Jun. 30, 2017, now U.S. Pat. No. 10,225,779, which is the National Stage filing under 35 U.S.C. 371 of International Application No. PCT/KR2015/014378, filed on Dec. 29, 2015, which claims the benefit of U.S. Provisional Appln. Nos. 62/098,295 filed on Dec. 30, 2014, 62/102,101 filed on Jan. 12, 2015, 62/157,978 filed on May 7, 2015, 62/158,547 filed on May 8, 2015 and 62/160,622 filed on May 13, 2015, the contents of which are all hereby incorporated by reference herein in their entirety.

BACKGROUND OF THE INVENTION

Field of the Invention

The present invention relates to wireless communications, and more particularly, to a method and apparatus for performing an inter-master eNodeB (MeNB) handover without secondary eNB (SeNB) change in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

As the dual connectivity has been introduced, various scenarios for handover may happen. Specifically, when one secondary eNB (SeNB) in dual connectivity is shared by two master eNBs (MeNBs), inter-MeNB handover without SeNB change may happen. A method for performing inter-MeNB handover without SeNB effectively may be required.

SUMMARY OF THE INVENTION

The present invention provides a method and apparatus for performing an inter-master eNodeB (MeNB) handover without secondary eNB (SeNB) change in a wireless communication system. The present invention provides a method and apparatus for transmitting a handover request message including an indication of a SeNB in dual connectivity. The present invention provides a method and apparatus for transmitting a SeNB addition request message including an indication of a user equipment (UE) served by the SeNB.

In an aspect, a method for performing, by a source master eNodeB (MeNB) in a dual connectivity, a handover procedure in a wireless communication system is provided. The method includes transmitting a handover request message including an indication of a secondary eNodeB (SeNB) in dual connectivity to a target MeNB in dual connectivity, and receiving a handover request acknowledge message from the target MeNB.

The indication of the SeNB may correspond to a SeNB identifier (ID).

The indication of the SeNB may correspond to a list of candidate SeNB IDs.

The indication of the SeNB may correspond to a SeNB UE X2AP ID, which was allocated by the SeNB. The SeNB UE X2AP ID may be allocated by the SeNB before the handover procedure is triggered.

The handover request message may further include measurement results of secondary cell group (SCG) cells for the SeNB.

The handover request acknowledge message may include an indication of keeping bearers of the SeNB.

A UE may be connected to both the source MeNB and the SeNB currently, and the UE may be to be handed over to the target MeNB by the handover procedure without change of the SeNB.

In another aspect, a method for performing, by a target master eNodeB (MeNB) in a dual connectivity, a handover procedure in a wireless communication system is provided. The method includes receiving a handover request message including a first indication of a secondary eNodeB (SeNB) in dual connectivity from a source MeNB in dual connectivity, and transmitting a SeNB addition request message including a second indication of a UE, served by the SeNB, to the SeNB.

The second indication of the UE may correspond to an old SeNB UE X2AP ID, which was allocated by the SeNB.

The SeNB addition request message may further include a source MeNB ID.

The method may further include receiving a SeNB addition acknowledge message including a third indication of keeping bearers of the SeNB from the SeNB. The third indication of keeping bearers of the SeNB may indicate whether original SeNB bearers are all accepted or partially accepted or indicates which specific SeNB bearer is accepted or not.

Inter-MeNB handover without SeNB change can be performed effectively.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
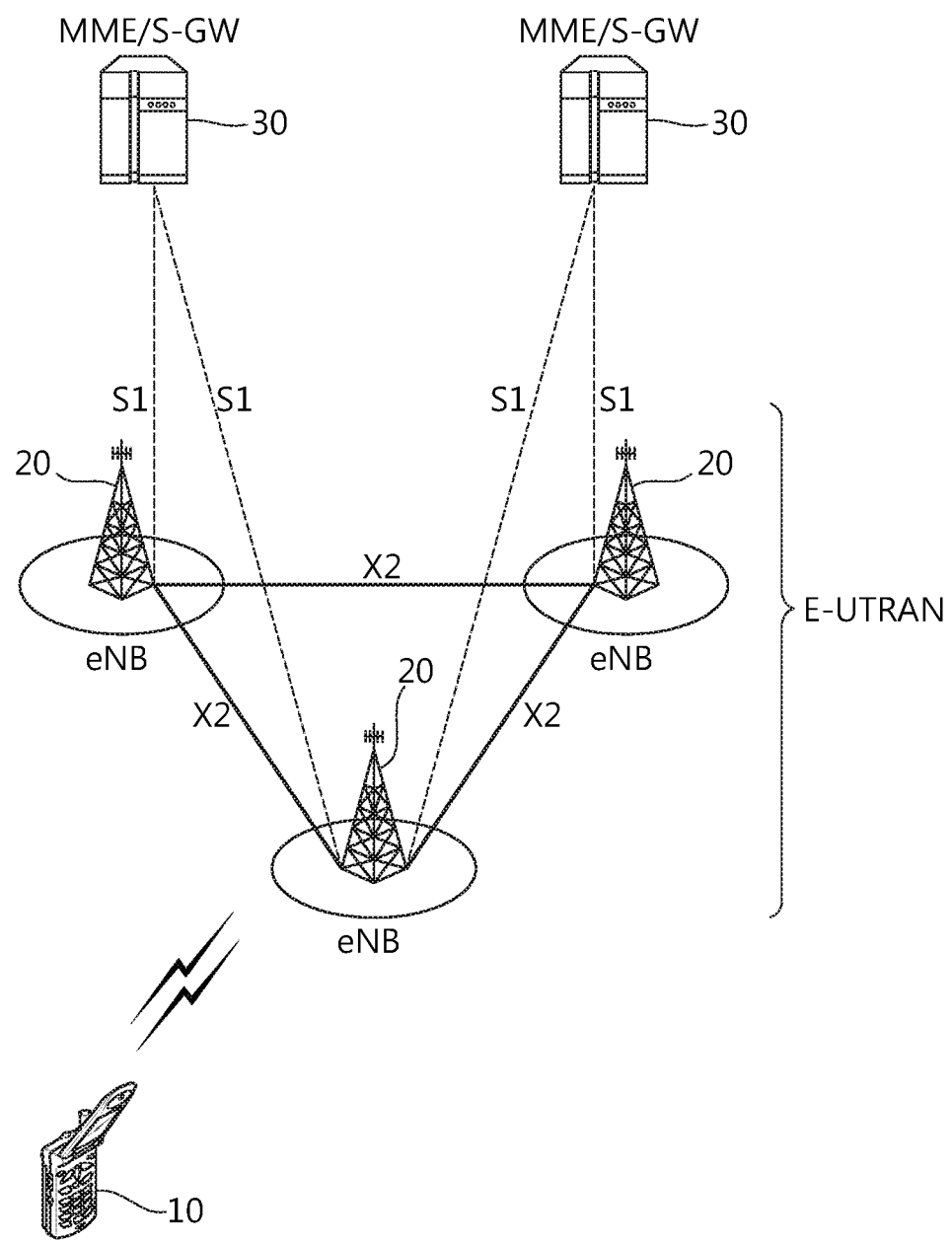
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
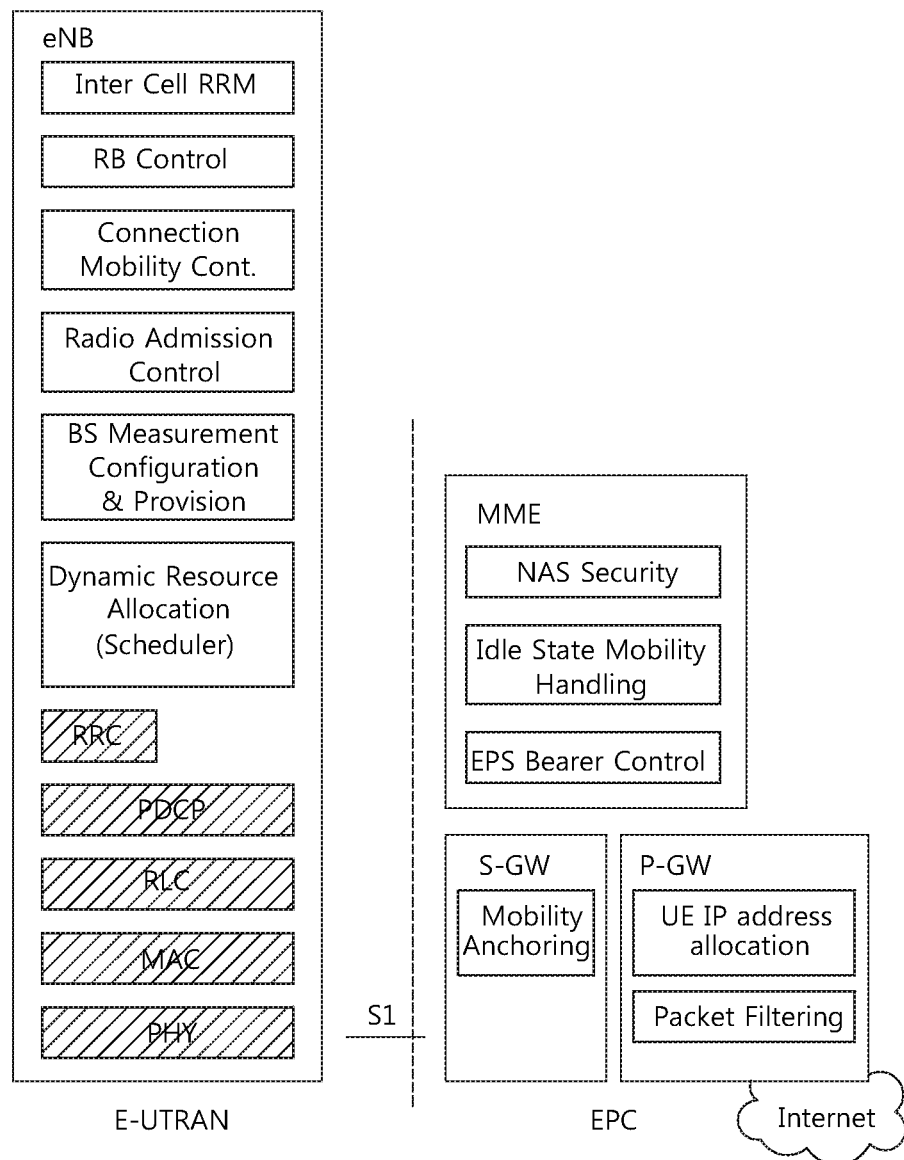
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
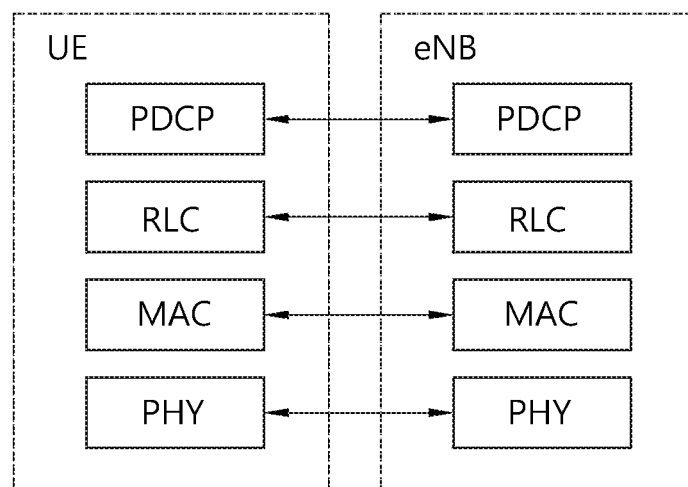
FIG. 3 shows a block diagram of a user plane protocol stack of an LTE system.
Figure 4:
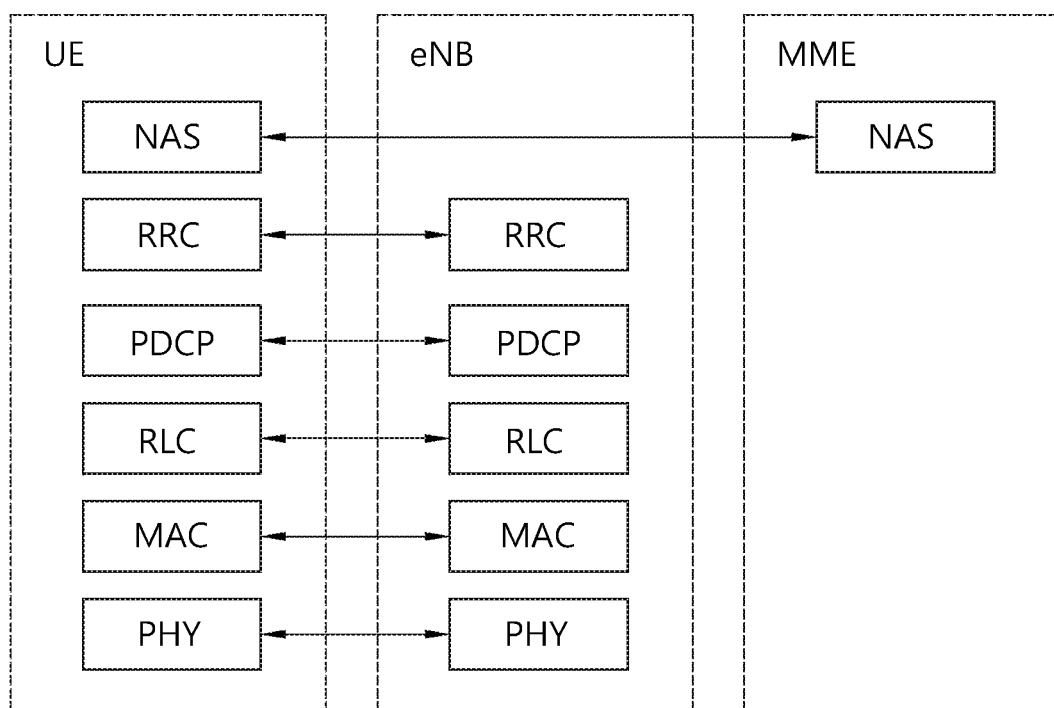
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
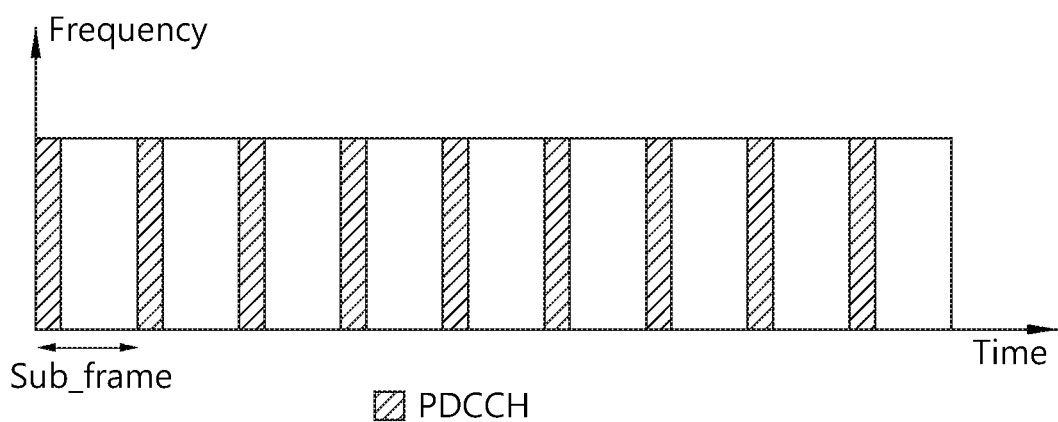
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013 December). The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
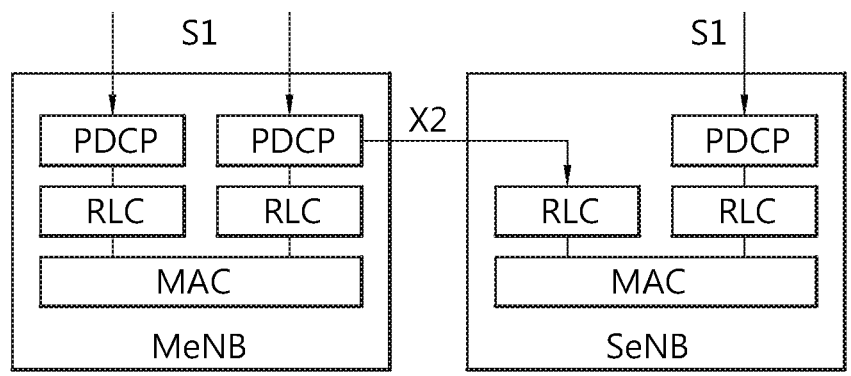
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
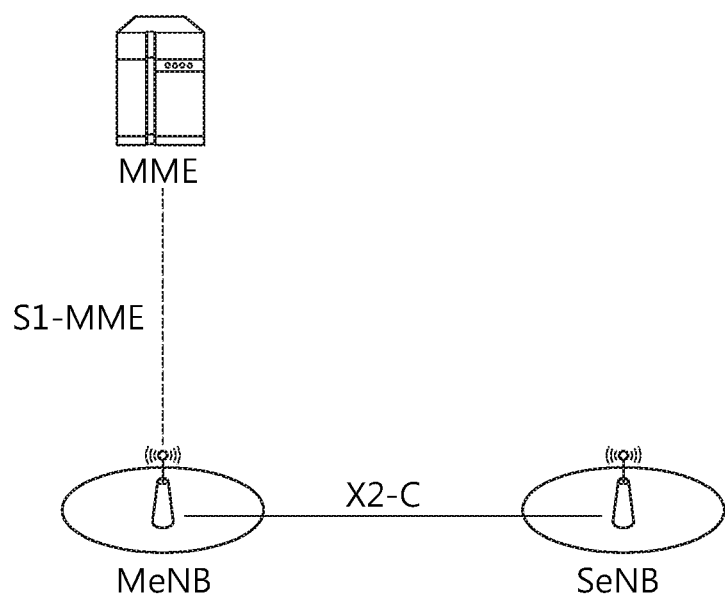
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
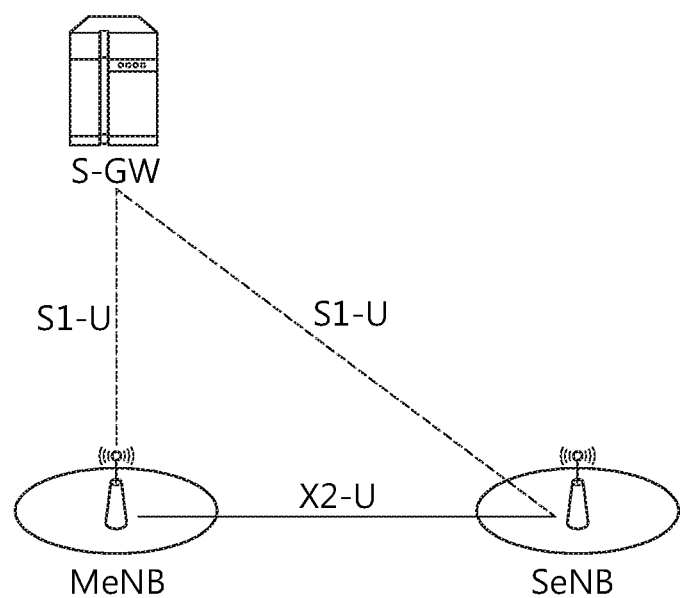
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
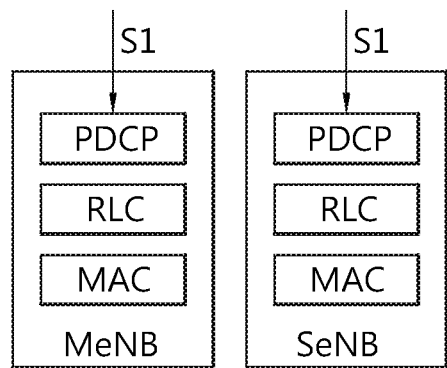
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split).

Figure 10:
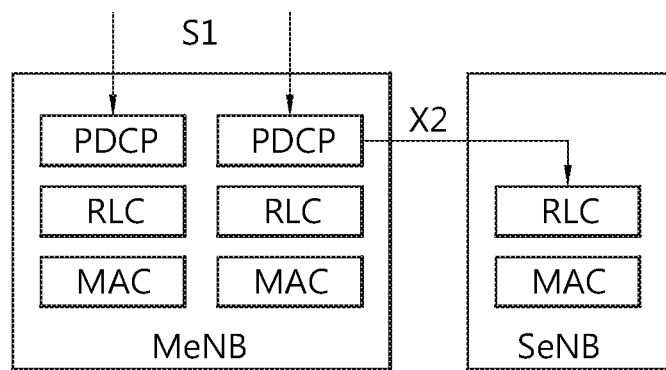
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers.

The corresponding UE architecture may be also changed to support the new feature.

Figure 11:
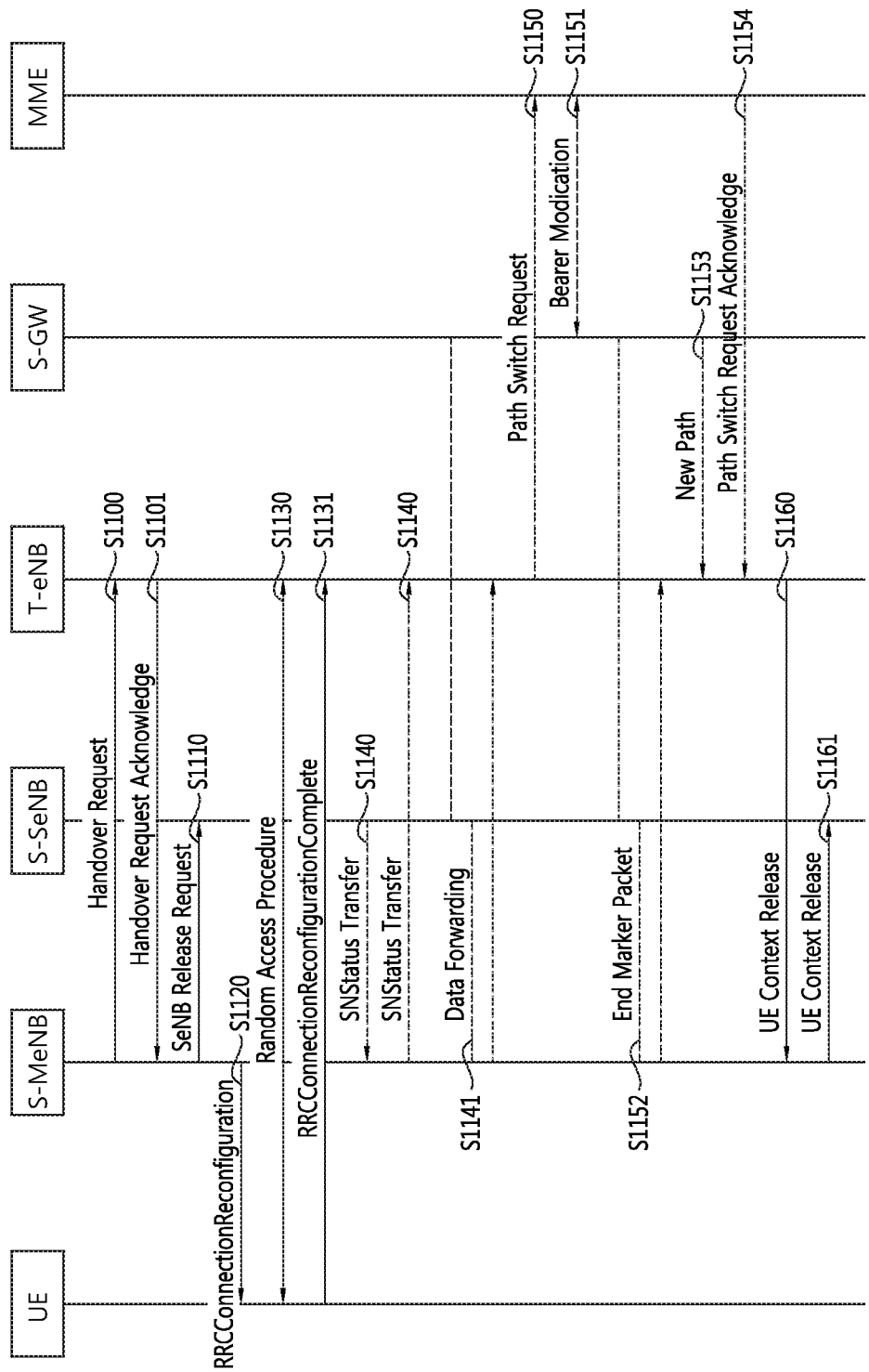
FIG. 11 shows an example of an X2 handover procedure for dual connectivity enhancement.

FIG. 11 shows an example of an X2 handover procedure for dual connectivity enhancement. FIG. 11 shows an example signaling flow for a MeNB to eNB change procedure, which is used to transfer context data from a source MeNB (S-MeNB)/SeNB to a target eNB (T-eNB).

In step S1110, the source MeNB starts the MeNB to eNB change procedure by initiating the X2 handover preparation procedure, i.e. transmitting the Handover Request message to the target eNB. The source MeNB includes the SCG configuration in the HandoverPreparationInformation. Table 1 shows the Handover Request message. This message is sent by the source eNB to the target eNB to request the preparation of resources for a handover.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0 \ldots 2^{32} -1)$ | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <max noof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |

TABLE 1-continued

| IE/Group Name | Presence | Range | IE type and reference | Semantics description | Criticality | Assigned Criticality |
|---|---|---|---|---|---|---|
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | 9.2.69 | | YES | ignore |
| UE History Information from the UE | O | | OCTET STRING | VisitedCellInfoList contained in the UEInformationResponse message (TS 36.331 [9]) | YES | ignore |
| Expected UE Behaviour | O | | 9.2.70 | | YES | ignore |

In step S1101, the target eNB transmits the Handover Request Acknowledge message to the source MeNB. The target eNB includes the field in handover command which releases SCG configuration, and may also provide forwarding addresses to the source MeNB. The addition of a SeNB can be initiated only after completing handover. Table 2 shows the Handover Request Acknowledge message. This message is sent by the target eNB to inform the source eNB about the prepared resources at the target.

In step S1110, if the allocation of target eNB resources was successful, the MeNB initiates the release of the source SeNB resources towards the source SeNB by transmitting the SeNB Release Request message. If data forwarding is needed, the MeNB provides data forwarding addresses to the source SeNB. Either direct data forwarding or indirect data forwarding is used for SCG bearer. Only indirect data forwarding is used for split bearer. Reception of the SeNB Release Request message triggers the source SeNB to stop

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| > E-RABs Admitted Item | | 1 . . . <max noof Bearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |
| >>DL GTP Tunnel Endpoint | O | | GTP Tunnel Endpoint 9.2.1 | Identifies the X2 transport bearer. used for forwarding of DL PDUs | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | O | | 9.2.7 | | YES | ignore | providing user data to the UE and, if applicable, to start data forwarding. Table 3 shows the SeNB Release Request message. This message is sent by the MeNB to the SeNB to request the release of resources.

transmit Path Switch Request Acknowledge message to the target eNB.

In step S1160, the target eNB initiates the UE context release procedure towards the source MeNB.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | ignore |
| MeNB UE X2AP ID | M | | eNB UE X2AP ID 9.2.24 | Allocated at the MeNB | YES | reject |
| SeNB UE X2AP ID | O | | eNB UE X2AP ID 9.2.24 | Allocated at the SeNB | YES | reject |
| Cause | O | | 9.2.6 | | YES | ignore |
| E-RABs To Be Released List | | 0 . . . 1 | | | — | — |
| > E-RABs To Be Released Item | | 1 . . . <max noof Bearers> | | | EACH | ignore |
| >>CHOICE Bearer Option | M | | | | | |
| >>>SCG Bearer | | | | | | |
| >>>>E-RAB ID | M | | 9.2.23 | | — | — |
| >>>>UL Forwarding GTP Tunnel Endpoint | O | | GTP Tunnel Endpoint 9.2.1 | Identifies the X2 transport bearer used for forwarding of UL PDUs | — | — |
| >>>>DL Forwarding GTP Tunnel Endpoint | O | | GTP Tunnel Endpoint 9.2.1 | Identifies the X2 transport bearer. used for forwarding of DL PDUs | — | — |
| >>>Split Bearer | | | | | | |
| >>>>E-RAB ID | M | | 9.2.23 | | — | — |
| >>>>DL Forwarding GTP Tunnel Endpoint | O | | GTP Tunnel Endpoint 9.2.1 | Identifies the X2 transport bearer. used for forwarding of DL PDUs | — | — |

In step S1120, the MeNB triggers the UE to apply the new configuration by transmitting the RRCConnectionReconfiguration message to the UE. Upon receiving the new configuration, the UE releases the entire SCG configuration.

The UE synchronizes to the target eNB. In step S1130, the UE performs random access procedure with the target eNB. In step S1131, the UE transmits the RRCConnectionReconfigurationComplete message to the target eNB.

In step S1140, sequence number (SN) Status Transfer message may be exchanged between the source MeNB and SeNB/target eNB. In step S1141, data forwarding from the SeNB takes place for E-UTRAN radio access bearers (E-RABs) configured with the SCG bearer option. It may start as early as the source SeNB receives the SeNB Release Request message from the MeNB.

The target eNB initiates the S1 path switch procedure. In step S1150, the target eNB may transmit the Path Switch Request message to the MME. In step S1151, the MME may perform the bearer modification procedure with the S-GW. In step S1152, the end marker packet may be transmitted from the S-GW, via the source MeNB, to the target eNB. In step S1153, the new packets may be transmitted from the S-GW to the target eNB. In step S1154, the MME may In step S1161, upon reception of the UE Context Release message, the SeNB can release radio and C-plane related resource associated to the UE context. Any ongoing data forwarding may continue.

Figure 12:
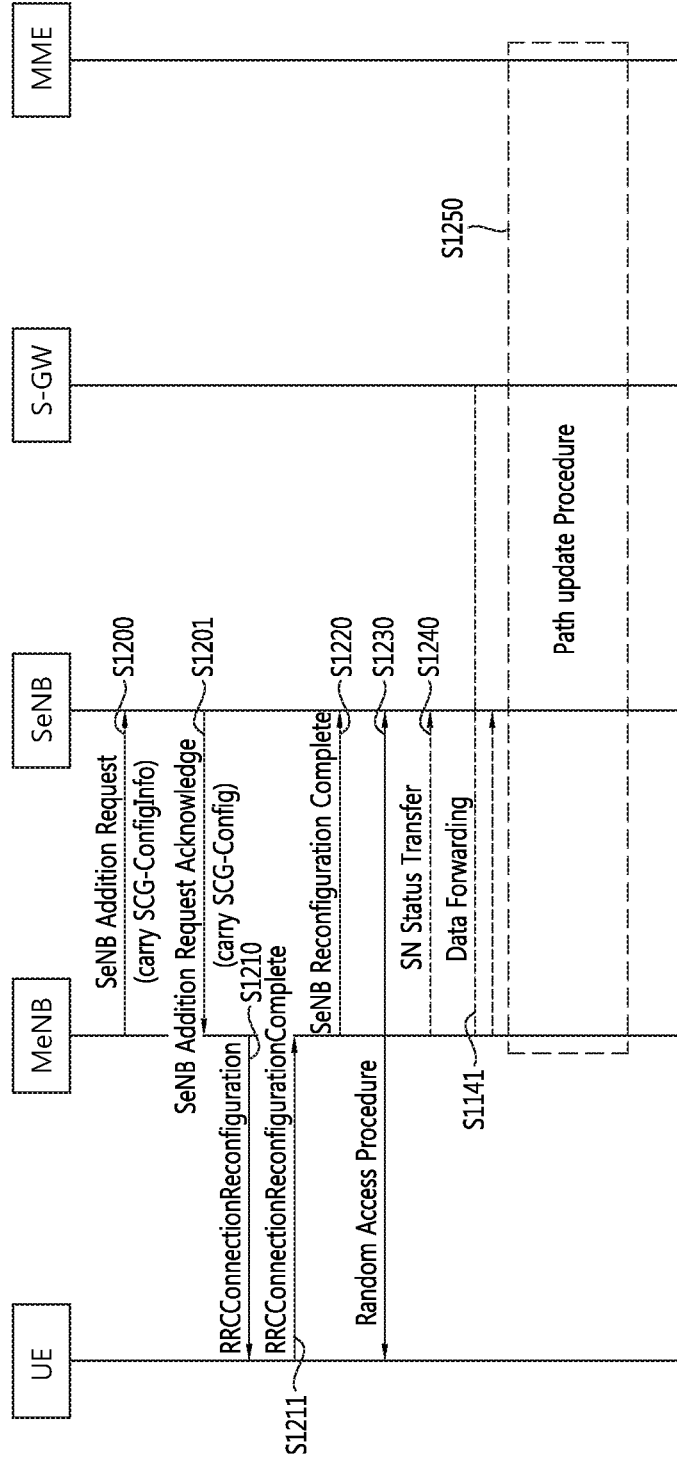
FIG. 12 shows an example of a SeNB addition procedure.

FIG. 12 shows an example of a SeNB addition procedure. The SeNB addition procedure is initiated by the MeNB and is used to establish a UE context at the SeNB in order to provide radio resources from the SeNB to the UE. This procedure is used to add at least the first cell (PSCell) of the SCG.

In step S1200, the MeNB decides to request the SeNB to allocate radio resources for a specific E-RAB, indicating E-RAB characteristics (E-RAB parameters, TNL address information corresponding to the UP option). In addition, MeNB indicates within SCG-ConfigInfo the MCG configuration (including security algorithm for SCG bearer) and the entire UE capabilities for UE capability coordination to be used as basis for the reconfiguration by the SeNB, but does not include SCG configuration. The MeNB can provide the latest measurement results for the SCG cell(s) requested to be added. The SeNB may reject the request. Table 4 shows the SeNB Addition Request message. This message is sent by the MeNB to the SeNB to request the preparation of resources for dual connectivity operation for a specific UE.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| UE Security Capabilities | C-ifSCG Bearer Option | | 9.2.29 | | YES | reject |
| SeNB Security Key | C-ifSCG Bearer Option | | 9.2.72 | The S-KeNB which is provided by the MeNB, see TS 33.401 [18]. | YES | reject |
| SeNB UE Aggregate Maximum Bit Rate | M | | UE Aggregate Maximum Bit Rate 9.2.12 | The UE Aggregate Maximum Bit Rate is split into MeNB UE Aggregate Maximum Bit Rate and SeNB UE Aggregate Maximum Bit Rate which are enforced by MeNB and SeNB respectively. | YES | reject |
| Serving PLMN | O | | PLMN Identity 9.2.4 | The serving PLMN of the SCG in the SeNB. | YES | ignore |
| E-RABs To Be Added List | | 1 | | | YES | reject |
| >E-RAB s To Be Added Item | | 1 ... <max noof Bearers> | | | EACH | reject |
| >>CHOICE Bearer Option | M | | | | — | — |
| >>>SCG Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>DL Forwarding | O | | 9.2.5 | | — | — |
| >>>>S1 UL GTP Tunnel Endpoint | M | | GTP Tunnel Endpoint 9.2.1 | SGW endpoint of the S1 transport bearer. For delivery of UL PDUs. | — | — |
| >>>Split Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>MeNB GTP Tunnel Endpoint | M | | GTP Tunnel Endpoint 9.2.1 | MeNB endpoint of the X2 transport bearer. For delivery of UL PDUs. | — | — |
| MeNB to SeNB Container | M | | OCTET STRING | Includes the SCG-ConfigInfo message as defined in TS 36.331 [9] | YES | reject |

In step S1201, if the radio resource management (RRM) entity in the SeNB is able to admit the resource request, it allocates respective radio resources and, dependent on the bearer option, respective transport network resources. The SeNB triggers random access so that synchronization of the SeNB radio resource configuration can be performed. The SeNB provides the new radio resource of SCG in SCG-Config to the MeNB. For SCG bearers, together with S1 DL TNL address information for the respective E-RAB and security algorithm, for split bearers X2 DL TNL address information.

In step S1210, if the MeNB endorses the new configuration, the MeNB sends the RRCConnectionReconfiguration message to the UE including the new radio resource configuration of SCG according to the SCG-Config.

In step S1211, the UE applies the new configuration and replies with RRCConnectionReconfigurationComplete message. In case the UE is unable to comply with (part of) the configuration included in the RRCConnectionReconfiguration message, it performs the reconfiguration failure procedure.

In step S1220, the MeNB informs the SeNB that the UE has completed the reconfiguration procedure successfully.

In step S1230, the UE performs synchronization towards the PSCell of the SeNB. The order the UE sends the RRCConnectionReconfigurationComplete message and performs the random access procedure towards the SCG is not defined. The successful RA procedure towards the SCG is not required for a successful completion of the RRC Connection Reconfiguration procedure.

In step S1240 and S1241, in case SCG bearers, and dependent on the bearer characteristics of the respective E-RAB, the MeNB may take actions to minimize service interruption due to activation of dual connectivity (Data forwarding, SN Status transfer).

In step S1250, for SCG bearers, the update of the UP path towards the EPC is performed.

Figure 13:
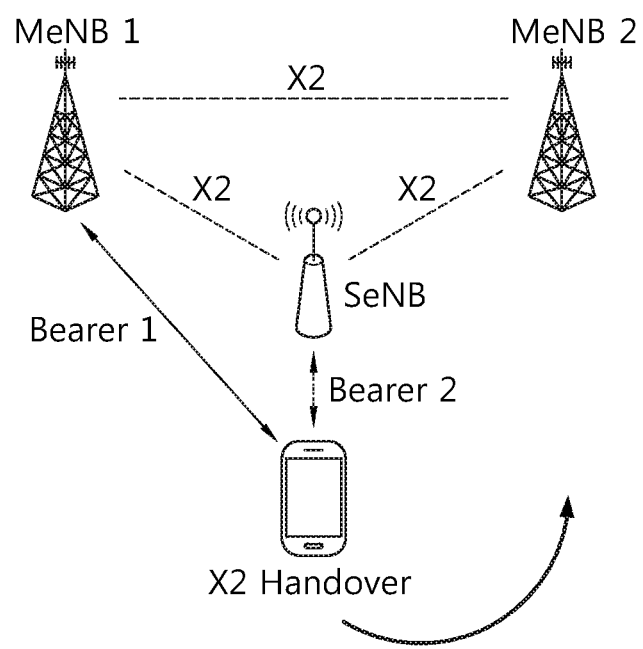
FIG. 13 shows an example of a deployment scenario with a common SeNB shared by two MeNBs.

FIG. 13 shows an example of a deployment scenario with a common SeNB shared by two MeNBs. Referring to FIG. 13, a UE is receiving dual connectivity service via bearer 1 from MeNB 1, and via bearer 2 from SeNB. The UE may be handed over to the neighbor MeNB, i.e. MeNB 2, which shares the SeNB with the MeNB 1.

If the current X2 handover procedure shown in FIG. 11 is applied to the deployment scenario shown in FIG. 13, the SeNB shared by two MeNBs has to be released from MeNB 1 first, and the target MeNB, i.e. MeNB 2, may add the SeNB again after X2 handover. That is, the SeNB addition procedure shown in FIG. 12 has to be performed again. This may not be the optimized procedure.

In order to solve the problem described above, various methods for performing an inter-MeNB handover without SeNB change are described below according to embodiments of the present invention.

Figure 14:
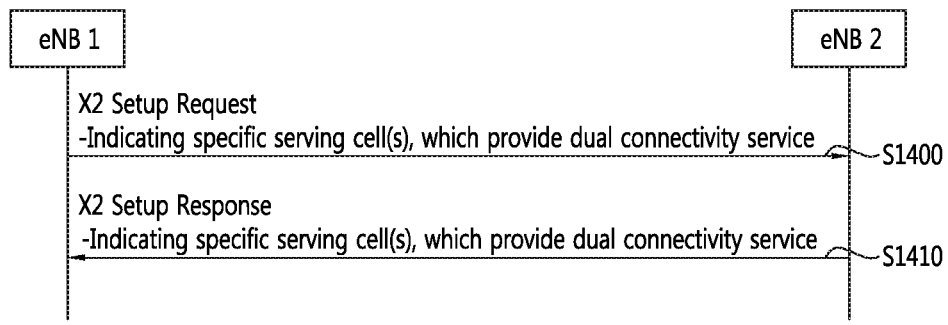
FIG. 14 shows a method for exchanging information about whether a common SeNB exists between MeNBs according to an embodiment of the present invention.

FIG. 14 shows a method for exchanging information about whether a common SeNB exists between MeNBs according to an embodiment of the present invention.

In step S1400, the eNB 1 transmits the X2 Setup Request message, which includes a specific indicator for specific serving cells of the eNB 1, to the eNB 2. The specific indicator may contain cell IDs of the specific overlapping serving cells. The specific indicator may further indicate that the specific serving cells provide dual connectivity service. The specific serving cells may correspond to potential SeNBs shared with the eNB 2.

In step S1410, the eNB 2 replies to the eNB 1 by transmitting the X2 Setup Response message, which also includes a specific indicator for specific serving cells of the eNB 2. The specific indicator may contain cell IDs of the specific overlapping serving cells. The specific indicator may further indicate that the specific serving cells provide dual connectivity service. The specific serving cells may correspond to potential SeNBs shared with the eNB 1.

When the eNB2 or eNB1 receives the X2 Setup Request/Response message with the specific indicator, it may check its own serving cells and compare them with the specific serving cells indicated by the specific indicator. Accordingly, the eNB 2 or eNB 1 may identify which cell is a common cell shared by neighbor eNBs and provides dual connectivity service.

Figure 15:
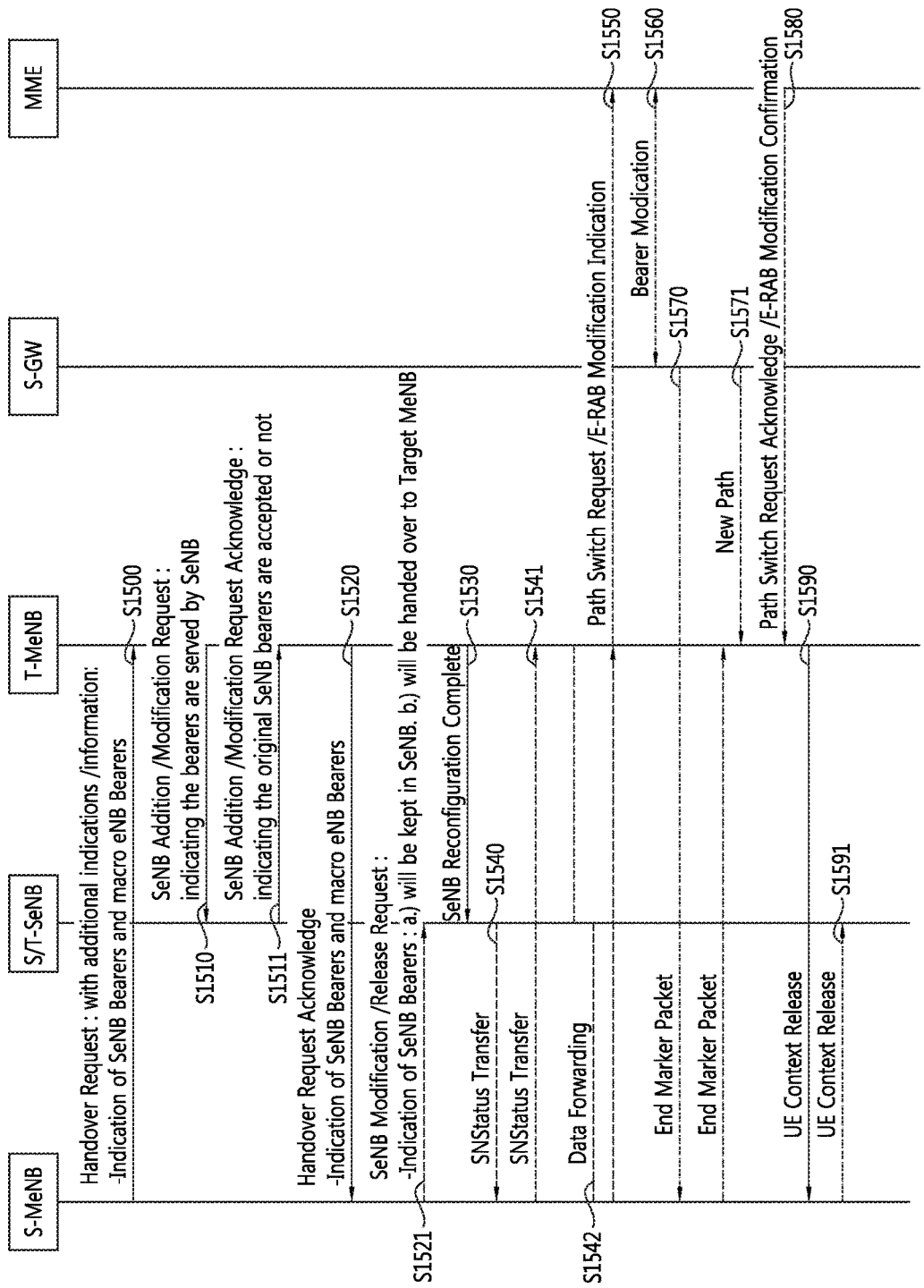
FIG. 15 shows a method for performing an inter-MeNB handover without SeNB change according to an embodiment of the present invention.

FIG. 15 shows a method for performing an inter-MeNB handover without SeNB change according to an embodiment of the present invention. In this embodiment, it may be assumed that the SeNB bearers (or, SeNB E-RABs) are not all kept during the handover. At first, the UE (not described in FIG. 15) may transmit the measurement report to the source MeNB, which makes a handover decision to the target MeNB for the UE. The source MeNB may also know that the UE is receiving a certain service from the SeNB, which is commonly controlled by the source MeNB and the target MeNB.

In step S1500, the source MeNB transmits the Handover Request message, which includes a first indicator, to target MeNB. The first indicator may be indication of SeNB bearers and/or MeNB bearers. By the first indicator, the target MeNB may differentiate the E-RABs To Be Setup List for the SeNB (i.e. SeNB bearers) and the E-RABs To Be Setup List for the MeNB (i.e. MeNB bearers). Further, by the first indicator, the target MeNB may know that the source MeNB has intention to keep the SeNB service/bearer. In this case, the first indicator may be realized by SeNB UE X2AP ID, which was allocated by the SeNB before handover is triggered. Further, the first indicator may be an indicator of the SeNB to indicate the target MeNB which SeNB service/bearer is kept for this the UE. In this case, the first indicator may be a SeNB (cell) ID. Or, the first indicator may be a list of potential candidate SeNBs for the target MeNB to select.

Further, the Handover Request message may include assistant information, i.e. measurement information, for the target MeNB to select the target SeNB. The measurement information may be contained in an independent IE in the Handover Request message. For example, the measurement information may be contained in MeNB to SeNB Container including SCG-ConfigInfo, as measResultServCellListSCG indicating measurement results of SCG (serving) cells. Or, the measurement information may be contained in RRC Context IE in the Handover Request Message.

In other words, the first indicator may help the target MeNB to make a decision on how to keep the SeNB. Table 5 shows an example of the Handover Request message according to an embodiment of the present invention.

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 ... $2^{32}$ −1) | MME UE S1AP ID allocated at the MME | — | — |
| >UE Security Capabilities | M | | 9.2.29 | | — | — |

TABLE 5-continued

| IE/Group Name | Presence | Range | IE type and reference | Semantics description | Criticality | Assigned Criticality |
|---|---|---|---|---|---|---|
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <max noof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >RRC Context | M | | OCTET STRING | Includes the RRC Handover Preparation Information message as defined in subclause 10.2.2 of TS 36.331 [9] It may also contain the measurement results of SCG (serving) cells, details are defined in TS 36.331 | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | 9.2.69 | | YES | ignore |
| UE History Information from the UE | O | | OCTET STRING | VisitedCellInfoList contained in the UEInformationResponse message (TS 36.331 [9]) | YES | ignore |
| Expected UE Behaviour | O | | 9.2.70 | | YES | ignore |
| Specific indicator: SeNB UE X2AP ID | O | | | | YES | ignore |

TABLE 5-continued

| IE/Group Name | Presence | Range | IE type and reference | Semantics description | Criticality | Assigned Criticality |
|---|---|---|---|---|---|---|
| measurement results of SCG (serving) cells, which could be contained in a container | O | | | | YES | ignore |
| specific indicator: SeNB ID or list of candidate SeNB IDs | O | | | | YES | ignore |

Referring to Table 5, comparing with the current Handover Request message shown in Table 1, the specific indicator of SeNB UE X2AP ID may be added in the Handover Request message. The specific indicator of SeNB UE X2AP ID may indicate that the source MeNB has intention to keep the SeNB service/bearer. Further, the specific indicator of measurements results of SCG cells may be added in the Handover Request message. Further, the specific indicator of SeNB ID or list of candidate SeNB IDs may be added in the Handover Request message.

Upon receiving the Handover Request message including the first indicator, the target MeNB may know that the SeNB service/bearer should be kept. Then, in step S1510, the target MeNB transmits the SeNB Addition/Modification Request message, which includes a second indicator, to the SeNB. The second indicator may indicate the SeNB that the requested bearers (with IDs) are currently served by the SeNB. That is, the second indicator may provide the SeNB with the meaning that the SeNB has to accept all of the corresponding bearers or partially. The second indicator may further include the updated security key, generated by the target MeNB, for the SeNB bearers.

In other words, the second indicator may help the SeNB to know that the UE was served by the SeNB before handover is triggered. That is, the second indicator may indicate the SeNB so that the SeNB can identify the UE. The second indicator may be realized by the old SeNB UE X2AP ID, which was allocated by the SeNB on the source MeNB side during the addition procedure. In addition, the source MeNB ID may be added in the SeNB Addition Request message in order to help the SeNB to identify the UE. The source MeNB ID may help to avoid the situation that X2AP ID was implemented per interface instead of per node.

Table 6 shows an example of the SeNB Addition Request message according to an embodiment of the present invention.

TABLE 6

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| UE Security Capabilities | C-ifSCG Bearer Option | | 9.2.29 | | YES | reject |
| SeNB Security Key | C-ifSCG Bearer Option | | 9.2.72 | The S-KeNB which is provided by the MeNB, see TS 33.401 [18]. | YES | reject |
| SeNB UE Aggregate Maximum Bit Rate | M | | UE Aggregate Maximum Bit Rate 9.2.12 | The UE Aggregate Maximum Bit Rate is split into MeNB UE Aggregate Maximum Bit Rate and SeNB UE Aggregate Maximum Bit Rate which are enforced by MeNB and SeNB respectively. | YES | reject |

TABLE 6-continued

| IE/Group Name | Presence | Range | IE type and reference | Semantics description | Criticality | Assigned Criticality |
|---|---|---|---|---|---|---|
| Serving PLMN | O | | PLMN Identity 9.2.4 | The serving PLMN of the SCG in the SeNB. | YES | ignore |
| E-RABs To Be Added List | | 1 | | | YES | reject |
| >E-RABs To Be Added Item | | 1 ... <maxnoof Bearers> | | | EACH | reject |
| >>CHOICE Bearer Option | M | | | | — | — |
| >>>SCG Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>DL Forwarding | O | | 9.2.5 | | — | — |
| >>>>S1 UL GTP Tunnel Endpoint | M | | GTP Tunnel Endpoint 9.2.1 | SGW endpoint of the S1 transport bearer. For delivery of UL PDUs. | — | — |
| >>>Split Bearer | | | | | | |
| >>>>E-RAB ID | M | | 9.2.23 | | — | — |
| >>>>E-RAB Level QoS Parameters | M | | 9.2.9 | Includes necessary QoS parameters | — | — |
| >>>>MeNB GTP Tunnel Endpoint | M | | GTP Tunnel Endpoint 9.2.1 | MeNB endpoint of the X2 transport bearer. For delivery of UL PDUs. | — | — |
| MeNB to SeNB Container | M | | OCTET STRING | Includes the SCG-ConfigInfo message as defined in TS 36.331 [9] | YES | reject |
| Old SeNB UE X2AP ID | O | | | It is allocated by the SeNB on the source MeNB side during the addition procedure | YES | ignore |
| Source MeNB ID | O | | | | YES | ignore |

Referring to Table 6, comparing with the current SeNB Addition Request message shown in Table 4, the old SeNB UE X2AP ID and the source MeNB ID may be added in the SeNB Addition Request message. The old SeNB UE X2AP ID may correspond to the second indicator. The old SeNB UE X2AP ID may be allocated by the SeNB on the source MeNB side during the addition procedure.

In step S1511, the SeNB gives a response with the SeNB Addition/Modification Request Acknowledge message, which includes a third indicator. The third indicator may indicate whether the original SeNB bearers are all accepted or partially accepted. That is, the third indicator may indicate information on which specific SeNB bearer is accepted and which specific SeNB bearer is not accepted. For the SeNB bearers not accepted by the SeNB, the target MeNB may accept the rejected SeNB bearer and put in the accepted MeNB bearers list, which is described in step S1520 below.

In step S1520, the target MeNB transmit the Handover Request Acknowledge message, which includes a fourth indicator, to the source MeNB. The fourth indicator may be indication of SeNB bearers and/or MeNB bearers. The fourth indicator may indicate the accepted SeNB bearers and/or rejected SeNB bearers, which are the SeNB bearers within the requested list. The fourth indicator may further indicate the accepted MeNB bearers and/or rejected MeNB bearers. As described above, if the rejected SeNB bearer exists, the accepted MeNB bearers may include the rejected SeNB bearer. The fourth indicator may further indicate whether the request of keeping the SeNB bearers are accepted or partially accepted.

In other words, the fourth indicator may indicate the source MeNB clearly whether the SeNB is kept or not. The fourth indicator may indicate to the source MeNB for release handling.

Table 7 shows an example of the Handover Request Acknowledge message according to the embodiment of the present invention.

may indicate that each SeNB bearer is to be kept in the SeNB. The fifth indicator may further indicate that each SeNB bearer is to be handed over to the target MeNB. The fifth indicator may further indicate the SeNB that only the X2 interface related resources, instead of radio resources, are released in case keeping is successful.

TABLE 7

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP | M | | eNB UE X2AP ID 9.2.24 | Allocated at the target eNB | YES | ignore |
| E-RABs Admitted List | | 1 | | | YES | ignore |
| > E-RABs Admitted Item | | 1 ... <max noof Bearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |
| >>DL GTP Tunnel Endpoint | O | | GTP Tunnel Endpoint 9.2.1 | Identifies the X2 transport bearer. used for forwarding of DL PDUs | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | O | | 9.2.7 | | YES | ignore |
| Indicator of successful SeNB Keeping | O | | | | YES | ignore |

Referring to Table 7, comparing with the current Handover Request Acknowledge message shown in Table 2, the indicator of successful SeNB keeping is further added. The indicator of successful SeNB keeping may correspond to the fourth indicator.

In step S1521, the source MeNB may transmit the SeNB Modification Request message or SeNB Release Request message to the SeNB. The SeNB Modification Request message may be transmitted when partial SeNB bearers are accepted. The SeNB Release Request message may be transmitted when all SeNB bearers are rejected. The SeNB Modification Request message or SeNB Release Request message may include a fifth indicator. The fifth indicator In other words, the fifth indicator may indicate to the SeNB for release handling. The fifth indicator may clearly indicate the SeNB the bearers to be kept in the SeNB through IP address of the SeNB and GPRS tunneling protocol (GTP) tunnel endpoint ID (TEID) allocated by the SeNB and the bearers to be handed over to the target MeNB through IP address of the MeNB and GTP TEID allocated by the MeNB.

Table 8 shows an example of the SeNB Release Request message according to the embodiment of the present invention.

TABLE 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| MeNB UE X2AP ID | M | | eNB UE X2AP ID 9.2.24 | Allocated at the MeNB | YES | reject |

TABLE 8-continued

| IE/Group Name | Presence | Range | IE type and reference | Semantics description | Criticality | Assigned Criticality |
|---|---|---|---|---|---|---|
| SeNB UE X2AP ID | O | | eNB UE X2AP ID 9.2.24 | Allocated at the SeNB | YES | reject |
| Cause | O | | 9.2.6 | | YES | ignore |
| E-RABs To Be Released List | | 0 ... 1 | | | — | — |
| >E-RABs To Be Released Item | | 1 ... <max noof Bearers> | | | EACH | ignore |
| >>CHOICE Bearer Option | M | | | | | |
| >>>SCG Bearer | | | | | | |
| >>>>E-RAB ID | M | | 9.2.23 | | — | — |
| >>>>UL Forwarding GTP Tunnel Endpoint | O | | GTP Tunnel Endpoint 9.2.1 | Identifies the X2 transport bearer used for forwarding of UL PDUs | — | — |
| >>>>DL Forwarding GTP Tunnel Endpoint | O | | GTP Tunnel Endpoint 9.2.1 | Identifies the X2 transport bearer. used for forwarding of DL PDUs | — | — |
| >>>Split Bearer | | | | | | |
| >>>>E-RAB ID | M | | 9.2.23 | | — | — |
| >>>>DL Forwarding GTP Tunnel Endpoint | O | | GTP Tunnel Endpoint 9.2.1 | Identifies the X2 transport bearer. used for forwarding of DL PDUs | — | — |
| Indicator of releasing only X2 related resource | O | | | | YES | ignore |

Referring to Table 8, comparing with the current Handover Request Acknowledge message shown in Table 3, the indicator of releasing only X2 related resource is further added. The indicator of releasing only X2 related resource may correspond to the fifth indicator.

Even though it is not described in FIG. 15, but as described in FIG. 11, the source MeNB may transmit the RRCConnectionReconfiguration message to the UE with the updated MeNB and SeNB configuration. And, the random access may be performed, and the UE may transmit the RRCConnectionReconfigurationComplete message to the target MeNB.

In step S1530, the target MeNB transmits the SeNB Reconfiguration Complete message to the SeNB for confirmation.

In step S1540, the SeNB may transmit the SN Status Transfer message to the source MeNB for the partial SeNB bearers (with indicator), for which the data forwarding is needed. In step S1541, the source MeNB may transmit the SN Status Transfer message to the target MeNB for the MeNB bearers (with indicator), and also for the partial SeNB bearers of step S1540. In step S1542, data forwarding may be initiated for the MeNB bearers and the partial SeNB bearers.

In step S1550, the target MeNB may transmit the Path Switch Request message or E-RAB Modification Indication message to the MME for bearer path change. The Path Switch Request message or E-RAB Modification Indication message may include an indication of E-RABs to be modified and E-RABs not to be modified. The Path Switch Request message or E-RAB Modification Indication message may further include an indication of E-RABs for the MeNB and E-RABs for the SeNB which keeps the SeNB bearers.

In step S1560, the S-GW and MME may perform bearer modification for bearer information updates by exchanging the Modify Bearer Request/Response messages. The Modify Bearer Request/Response messages may include an indication of bearers to be modified and bearers not to be modified.

In step S1570, the end marker may be transmitted. In step S1571, the new packets may be transmitted.

In step S1580, the MME may transmit the Path Switch Request Acknowledge message or E-RAB Modification Confirmation message to the target MeNB for response of bearer path change. The Path Switch Request Acknowledge message or E-RAB Modification Confirmation message may include an indication of E-RABs modified and E-RABs failed to modify. The Path Switch Request Acknowledge message or E-RAB Modification Confirmation message may further include information of MeNB bearers or SeNB bearers.

In step S1590, the target MeNB transmits the UE Context Release message to the source MeNB to release the UE context.

In step S1591, the source MeNB may transmit the UE Context Release message to the SeNB if all of the SeNB bearers are rejected in step S1511 described above.

Figure 16:
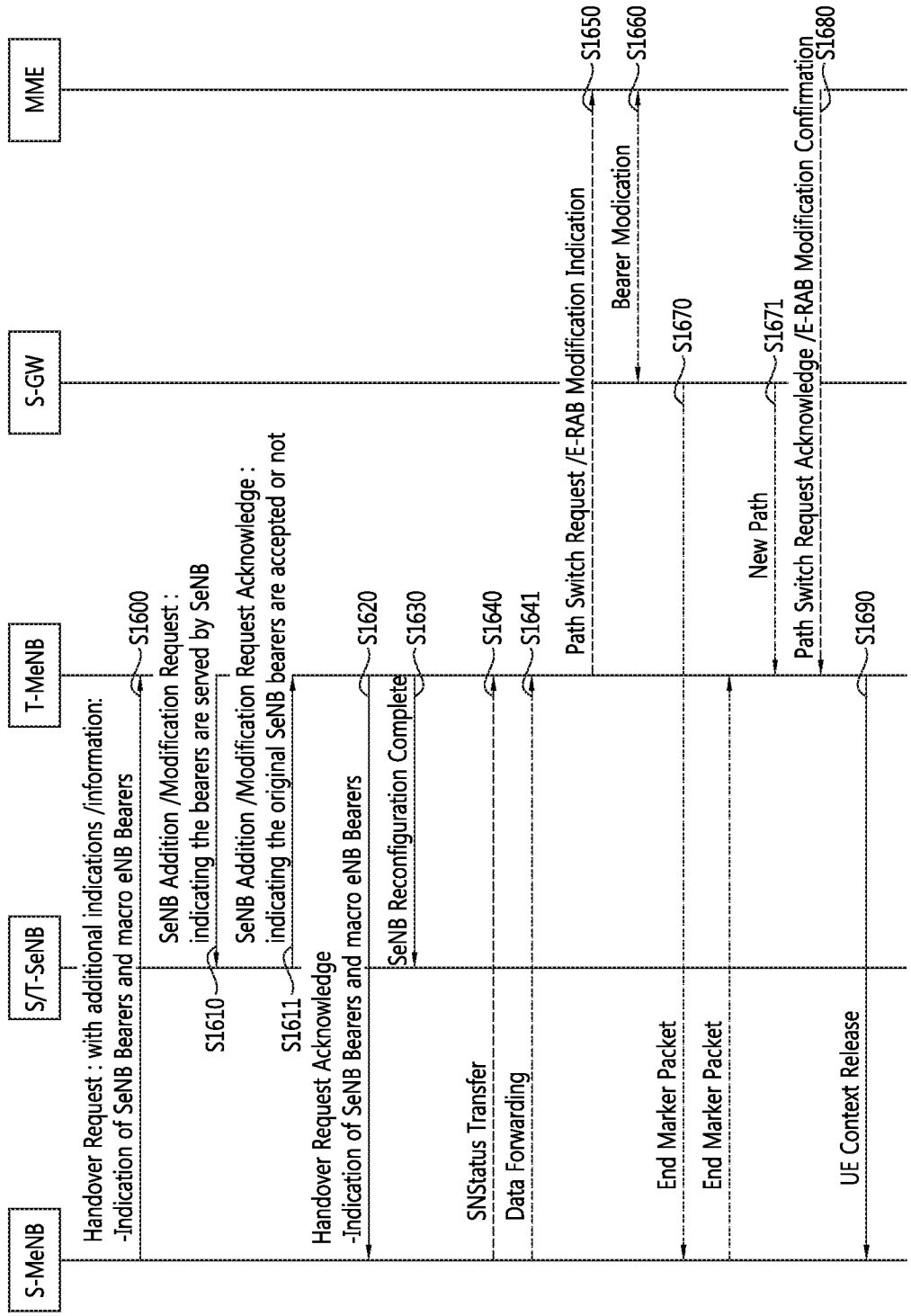
FIG. 16 shows a method for performing an inter-MeNB handover without SeNB change according to an embodiment of the present invention.

FIG. 16 shows a method for performing an inter-MeNB handover without SeNB change according to an embodiment of the present invention. In this embodiment, it may be assumed that the SeNB bearers (or, SeNB E-RABs) are kept during the handover. At first, the UE (not described in FIG. 16) may transmit the measurement report to the source MeNB, which makes a handover decision to the target MeNB for the UE. The source MeNB may also know that the UE is receiving a certain service from the SeNB, which is commonly controlled by the source MeNB and the target MeNB.

In step S1600, the source MeNB transmits the Handover Request message, which includes a first indicator, to target MeNB. The first indicator may be indication of SeNB bearers and/or MeNB bearers. By the first indicator, the target MeNB may differentiate the E-RABs To Be Setup List for the SeNB (i.e. SeNB bearers) and the E-RABs To Be Setup List for the MeNB (i.e. MeNB bearers). Further, by the first indicator, the target MeNB may know that the source MeNB has intention to keep the SeNB service/bearer. For example, the first indicator may be an indicator of the SeNB, e.g. (cell) ID of the SeNB. In this case, the first indicator may indicate the target MeNB which SeNB service/bearer is kept for this the UE. The Handover Request message may follow Table 5 described above.

Upon receiving the Handover Request message including the first indicator, the target MeNB may know that the SeNB service/bearer should be kept. Then, in step S1610, the target MeNB transmits the SeNB Addition/Modification Request message, which includes a second indicator, to the SeNB. The second indicator may indicate the SeNB that the requested bearers (with IDs) are currently served by the SeNB. That is, the second indicator may provide the SeNB with the meaning that the SeNB has to accept the corresponding bearers. The second indicator may further include the updated security key, generated by the target MeNB, for the SeNB bearers. The SeNB Addition Request message may follow Table 6 described above.

In step S1611, the SeNB gives a response with the SeNB Addition/Modification Request Acknowledge message, which includes a third indicator. The third indicator may indicate whether the original SeNB bearers are accepted or not.

In step S1620, the target MeNB transmit the Handover Request Acknowledge message, which includes a fourth indicator, to the source MeNB. The fourth indicator may be indication of SeNB bearers and/or MeNB bearers. The fourth indicator may indicate the accepted SeNB bearers, which are the SeNB bearers within the requested list. The fourth indicator may further indicate the accepted MeNB bearers and/or rejected MeNB bearers. The fourth indicator may further indicate whether the request of keeping the SeNB bearers are accepted or not. The Handover Request Acknowledge message may follow Table 7 described above.

Even though it is not described in FIG. 16, but as described in FIG. 11, the source MeNB may transmit the RRCConnectionReconfiguration message to the UE with the updated MeNB and SeNB configuration. And, the random access may be performed, and the UE may transmit the RRCConnectionReconfigurationComplete message to the target MeNB.

In step S1630, the target MeNB transmits the SeNB Reconfiguration Complete message to the SeNB for confirmation.

In step S1640, the source MeNB may transmit the SN Status Transfer message to the target MeNB only for the MeNB bearers (with indicator). Since the SeNB bearers are kept, data forwarding may not be needed for the SeNB bearers. In step S1641, data forwarding may be initiated for the MeNB bearers.

In step S1650, the target MeNB may transmit the Path Switch Request message or E-RAB Modification Indication message to the MME for bearer path change. The Path Switch Request message or E-RAB Modification Indication message may include an indication of E-RABs to be modified and E-RABs not to be modified. The Path Switch Request message or E-RAB Modification Indication message may further include an indication of E-RABs for the MeNB and E-RABs for the SeNB which keeps the SeNB bearers.

In step S1660, the S-GW and MME may perform bearer modification for bearer information updates by exchanging the Modify Bearer Request/Response messages. The Modify Bearer Request/Response messages may include an indication of bearers to be modified and bearers not to be modified.

In step S1670, the end marker may be transmitted. In step S1671, the new packets may be transmitted.

In step S1680, the MME may transmit the Path Switch Request Acknowledge message or E-RAB Modification Confirmation message to the target MeNB for response of bearer path change. The Path Switch Request Acknowledge message or E-RAB Modification Confirmation message may include an indication of E-RABs modified and E-RABs failed to modify. The Path Switch Request Acknowledge message or E-RAB Modification Confirmation message may further include information of MeNB bearers or SeNB bearers.

In step S1690, the target MeNB transmits the UE Context Release message to the source MeNB to release the UE context.

Figure 17:
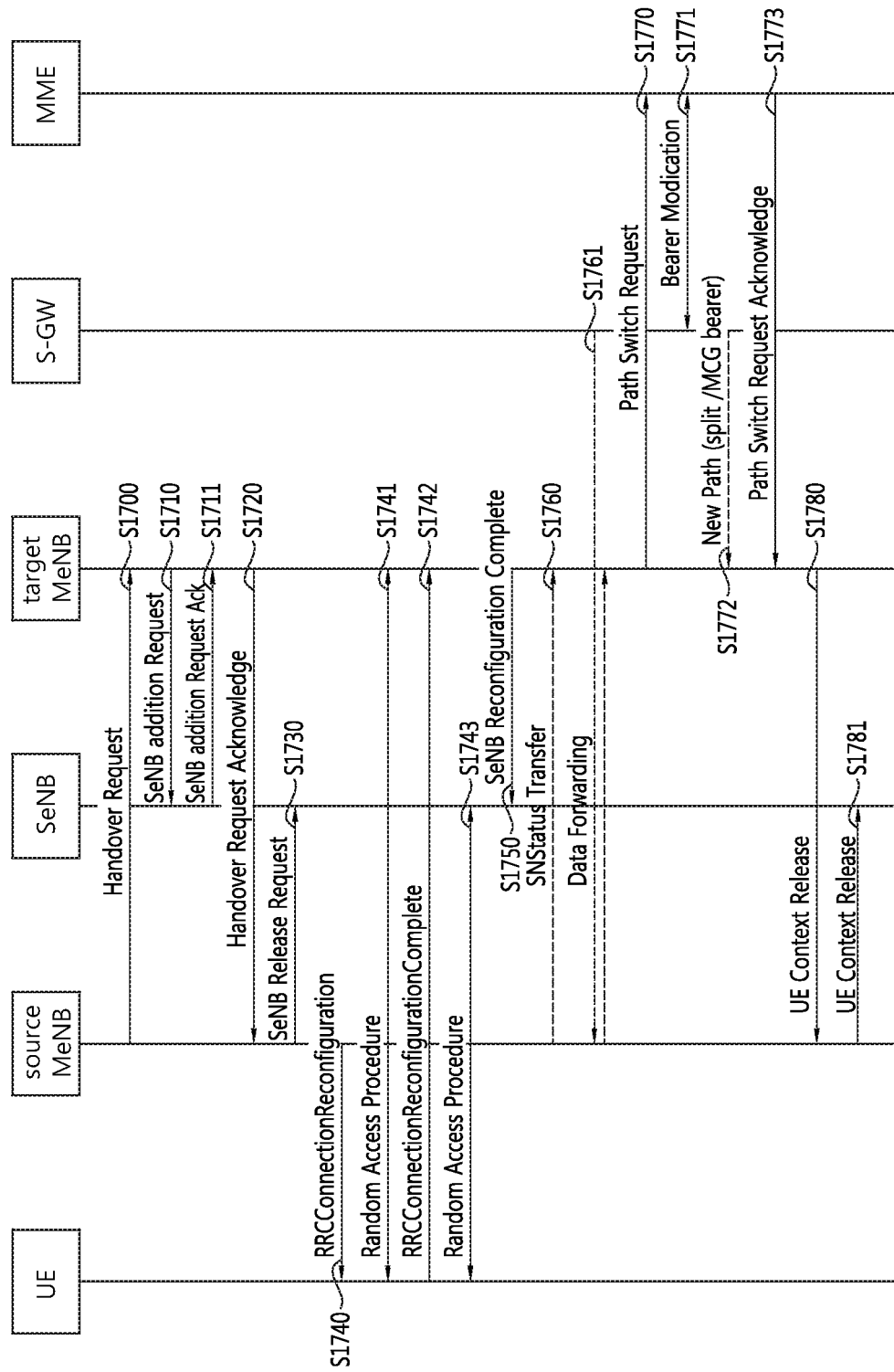
FIG. 17 shows a method for performing an inter-MeNB handover without SeNB change according to an embodiment of the present invention.

FIG. 17 shows a method for performing an inter-MeNB handover without SeNB change according to an embodiment of the present invention.

In step S1700, the source MeNB starts the handover procedure by initiating the X2 handover preparation procedure. The source MeNB includes the SCG configuration in the HandoverPreparationInformation. The source MeNB includes the SeNB UE X2AP ID and SeNB ID as a reference to the UE context in the SeNB that was established by the source MeNB in the Handover Request message. The handover request message may follow Table 5 described above.

In step S1700, if the target MeNB decides to keep the SeNB, the target MeNB sends SeNB Addition Request message to the SeNB including the SeNB UE X2AP ID as a reference to the UE context in the SeNB that was established by the source MeNB. The SeNB Addition Request message may follow Table 6 described above.

In step S1711, the SeNB replies with SeNB Addition Request Acknowledge message to the target MeNB. An indicator as the UE context kept in the SeNB may be introduced in the SeNB Addition Request Acknowledge message.

In step S1720, the target MeNB includes within the Handover Request Acknowledge message a transparent container to be sent to the UE as an RRC message to perform the handover which also includes the SCG configuration, and may also provide forwarding addresses to the source MeNB. The target MeNB indicates to the source MeNB that the UE context in the SeNB is kept if the target MeNB and the SeNB decided to keep the UE context in the SeNB in step S1710 and S1711. The Handover Request Acknowledge message may follow Table 7 described above.

In step S1730, the source MeNB sends the SeNB Release Request message to the SeNB. The source MeNB indicates to the SeNB that the UE context in SeNB is kept. If the indication as the UE context kept in SeNB is included, the SeNB keeps the UE context. The SeNB Release Request message may follow Table 8 described above.

In step S1740, the source MeNB triggers the UE to apply the new configuration.

In steps S1741 and S1742, the UE synchronizes to the target MeNB and replies with RRCConnectionReconfigurationComplete message.

In step S1743, the UE synchronizes to the SeNB.

In step S1750, if the RRC connection reconfiguration procedure was successful, the target MeNB informs the SeNB.

In steps S1760 and S1761, data forwarding from the source MeNB takes place. Data forwarding may be omitted for SCG bearers. Direct data forwarding from the source MeNB to the SeNB is not possible for split bearers. Direct data forwarding may occur only for bearer type change.

From steps S1770 to S1773, the target MeNB initiates the S1 path switch procedure. If new UL TEIDs of the S-GW are included, the target MeNB performs MeNB initiated SeNB modification procedure to provide them to the SeNB.

In step S1780, the target MeNB initiates the UE context release procedure towards the source MeNB.

In step S1781, upon reception of the UE context release message, the SeNB can release C-plane related resource associated to the UE context towards the source MeNB. Any ongoing data forwarding may continue. The SeNB shall not release the UE context associated with the target MeNB if the indication was included in the SeNB Release Request in step S1730.

Figure 18:
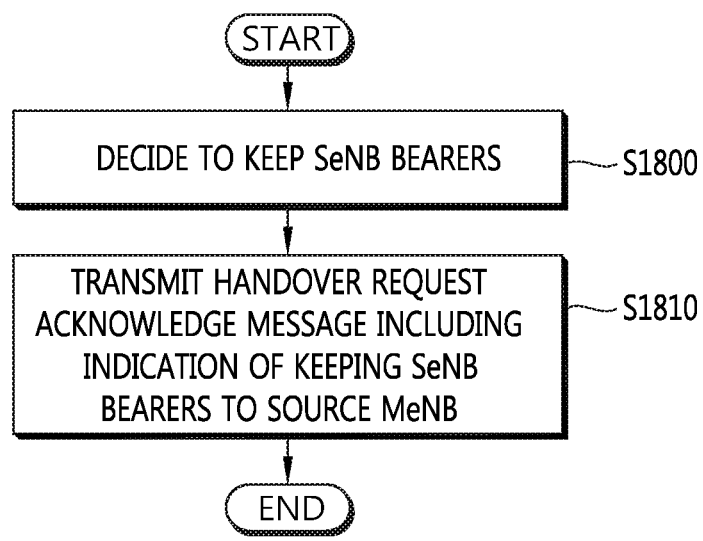
FIG. 18 shows a method for performing, by a target MeNB, an inter-MeNB handover without SeNB change according to an embodiment of the present invention.

FIG. 18 shows a method for performing, by a target MeNB, an inter-MeNB handover without SeNB change according to an embodiment of the present invention. A UE is connected to both the source MeNB and the SeNB currently, and the UE is to be handed over to the target MeNB by the handover procedure without change of the SeNB.

In step S1800, the target MeNB decides to keep bearers of the SeNB during inter-MeNB handover without SeNB change. In step S1810, the target MeNB transmits a handover request acknowledge message including an indication of keeping the bearers of the SeNB to the source MeNB. Step S1810 may correspond to step S1520 in FIG. 15, step S1620 in FIG. 16, or step S1720 in FIG. 17. That is, the handover request acknowledge message may follow Table 7 described above. The indication of keeping the bearers of the SeNB indicates that a UE context in the SeNB is kept. The indication of keeping the bearers of the SeNB may indicate whether a request of keeping the bearers of the SeNB are accepted or not. The indication of keeping the bearers of the SeNB may indicate whether the SeNB is kept or not.

The target MeNB may further receive a handover request message from the source MeNB before deciding to keep the bearers of the SeNB. The handover request message may include an ID of the SeNB.

Figure 19:
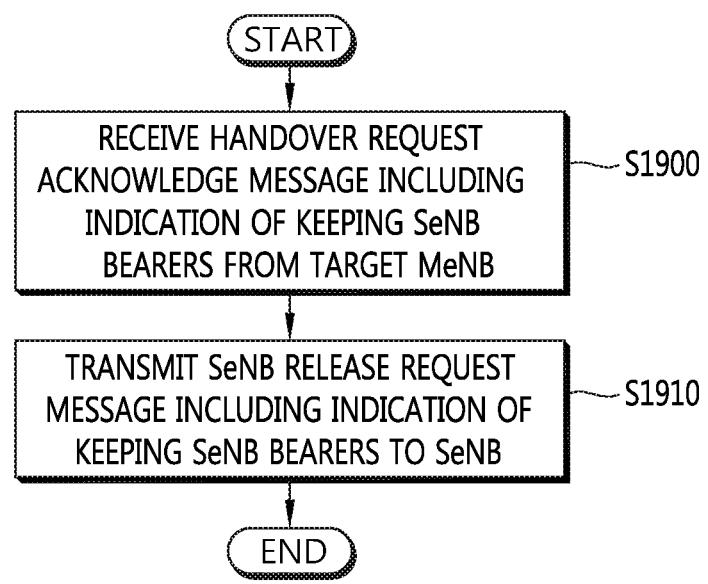
FIG. 19 shows a method for performing, by a source MeNB, an inter-MeNB handover without SeNB change according to an embodiment of the present invention.

FIG. 19 shows a method for performing, by a source MeNB, an inter-MeNB handover without SeNB change according to an embodiment of the present invention. A UE is connected to both the source MeNB and the SeNB currently, and the UE is to be handed over to the target MeNB by the handover procedure without change of the SeNB.

In step S1900, the source MeNB receives a handover request acknowledge message including a first indication of keeping bearers of the SeNB from a target MeNB in dual connectivity. Step S1900 may correspond to step S1520 in FIG. 15, step S1620 in FIG. 16, step S1720 in FIG. 17, or step S1810 in FIG. 18. That is, the handover request acknowledge message may follow Table 7 described above. The first indication of keeping the bearers of the SeNB may indicate that a UE context in the SeNB is kept.

In step S1910, the source MeNB transmits a SeNB release request message including a second indication of keeping the bearers of the SeNB to the SeNB. Step S1910 may correspond to step S1521 in FIG. 15, or step S1730 in FIG. 17. That is, the SeNB release request message may follow Table 8 described above. The second indication of keeping the bearers of the SeNB may indicate that a UE context in the SeNB is kept. The second indication of keeping the bearers of the SeNB may further indicate that only X2 interface related resources are released when the UE context in the SeNB is kept. The second indication of keeping the bearers of the SeNB may further indicate that the bearers in the SeNB is kept through an IP address of the SeNB and a GTP TEID allocated by the SeNB. Upon receiving the SeNB release request message, the SeNB shall, if supported, only release the resources related to the UE-associated signaling connection between the MeNB and the SeNB.

The source MeNB may further transmit a handover request message to the target MeNB before receiving the handover request acknowledge message. The handover request message may include an ID of the SeNB.

Figure 20:
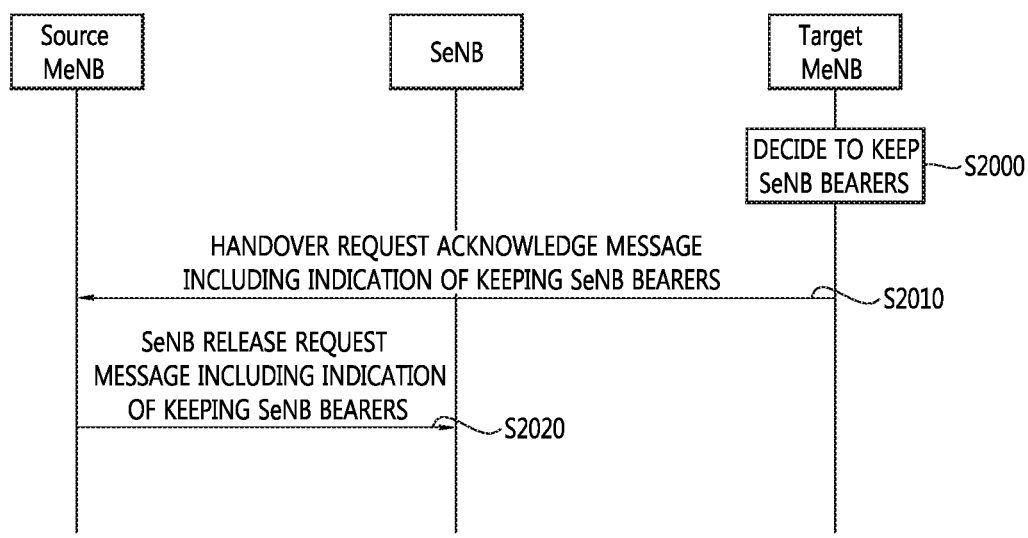
FIG. 20 shows a method for performing an inter-MeNB handover without SeNB change according to an embodiment of the present invention.

FIG. 20 shows a method for performing an inter-MeNB handover without SeNB change according to an embodiment of the present invention. A UE is connected to both the source MeNB and the SeNB currently, and the UE is to be handed over to the target MeNB by the handover procedure without change of the SeNB.

In step S2000, the target MeNB decides to keep bearers of the SeNB during inter-MeNB handover without SeNB change. In step S2010, the target MeNB transmits a handover request acknowledge message including a first indication of keeping the bearers of the SeNB to the source MeNB. Step S2010 may correspond to step S1520 in FIG. 15, step S1620 in FIG. 16, step S1720 in FIG. 17, step S1810 in FIG. 18, or step S1900 in FIG. 19. That is, the handover request acknowledge message may follow Table 7 described above. The indication of keeping the bearers of the SeNB indicates that a UE context in the SeNB is kept. The indication of keeping the bearers of the SeNB may indicate whether a request of keeping the bearers of the SeNB are accepted or not. The indication of keeping the bearers of the SeNB may indicate whether the SeNB is kept or not.

In step S2020, the source MeNB transmits a SeNB release request message including a second indication of keeping the bearers of the SeNB to the SeNB. Step S2020 may correspond to step S1521 in FIG. 15, step S1730 in FIG. 17, or step S1910 in FIG. 19. That is, the SeNB release request message may follow Table 8 described above. The second indication of keeping the bearers of the SeNB may indicate that a UE context in the SeNB is kept. The second indication of keeping the bearers of the SeNB may further indicate that only X2 interface related resources are released when the UE context in the SeNB is kept. The second indication of keeping the bearers of the SeNB may further indicate that the bearers in the SeNB is kept through an IP address of the SeNB and a GTP TEID allocated by the SeNB. Upon receiving the SeNB release request message, the SeNB shall, if supported, only release the resources related to the UE-associated signaling connection between the MeNB and the SeNB.

Figure 21:
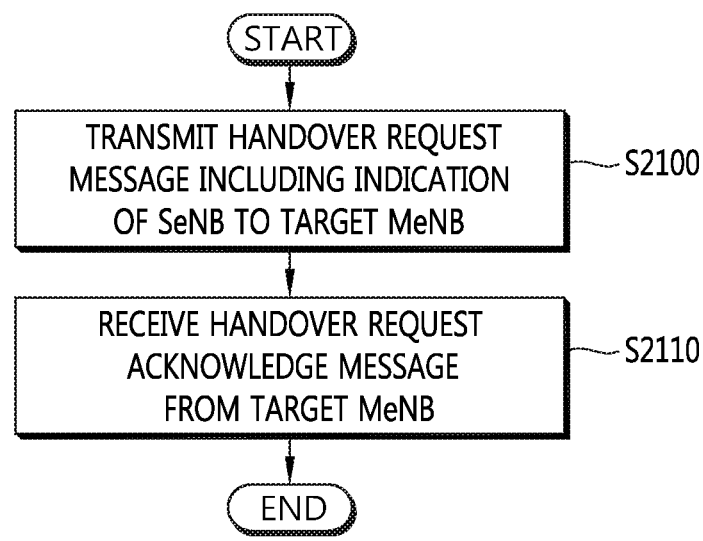
FIG. 21 shows a method for performing, by a source MeNB, an inter-MeNB handover without SeNB change according to an embodiment of the present invention.

FIG. 21 shows a method for performing, by a source MeNB, an inter-MeNB handover without SeNB change according to an embodiment of the present invention. A UE is connected to both the source MeNB and the SeNB currently, and the UE is to be handed over to the target MeNB by the handover procedure without change of the SeNB.

In step S2100, the source MeNB transmits a handover request message including an indication of the SeNB to the target MeNB. Step S2100 may correspond to step S1500 in FIG. 15, step S1600 in FIG. 16, or step S1700 in FIG. 17. That is, the handover request message may follow Table 5 described above. The indication of the SeNB corresponds to a SeNB ID. Or, the indication of the SeNB may correspond to a list of candidate SeNB IDs. Further, the indication of the SeNB may correspond to a SeNB UE X2AP ID, which was allocated by the SeNB. The SeNB UE X2AP ID may be allocated by the SeNB before the handover procedure is triggered. The handover request message may further include measurement results of SCG cells for the SeNB.

In step S2110, the source MeNB receives a handover request acknowledge message from the target MeNB. The handover request acknowledge message may include an indication of keeping bearers of the SeNB. Step S2110 may correspond to step S1520 in FIG. 15, step S1620 in FIG. 16, step S1720 in FIG. 17, step S1810 in FIG. 18, step S1900 in FIG. 19, or step S2010 in FIG. 20. That is, the handover request acknowledge message may follow Table 7 described above.

Figure 22:
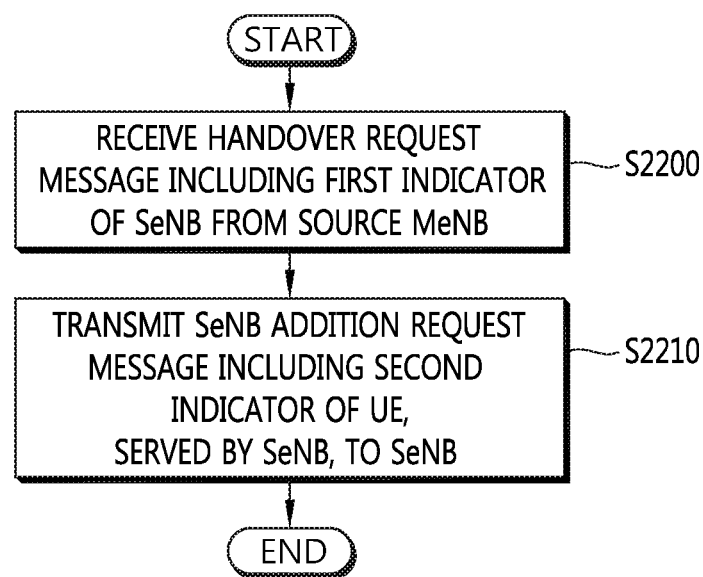
FIG. 22 shows a method for performing, by a target MeNB, an inter-MeNB handover without SeNB change according to an embodiment of the present invention.

FIG. 22 shows a method for performing, by a target MeNB, an inter-MeNB handover without SeNB change according to an embodiment of the present invention. A UE is connected to both the source MeNB and the SeNB currently, and the UE is to be handed over to the target MeNB by the handover procedure without change of the SeNB.

In step S2200, the target MeNB receives a handover request message including a first indication of the SeNB from the source MeNB. Step S2200 may correspond to step S1500 in FIG. 15, step S1600 in FIG. 16, step S1700 in FIG. 17, or step S2100 in FIG. 21. That is, the handover request message may follow Table 5 described above. The first indication of the SeNB may correspond to a SeNB ID.

In step S2210, the target MeNB transmits a SeNB addition request message including a second indication of a UE, served by the SeNB, to the SeNB. Step S2210 may correspond to step S1510 in FIG. 15, step S1610 in FIG. 16, or step S1710 in FIG. 17. That is, the SeNB addition request message may follow Table 6 described above. The second indication of the UE may correspond to an old SeNB UE X2AP ID, which was allocated by the SeNB. The SeNB addition request message may further include a source MeNB ID.

The target MeNB may further receive a SeNB addition acknowledge message including a third indication of keeping bearers of the SeNB from the SeNB. The SeNB addition acknowledge message may correspond to step S1511 in FIG. 15, step S1611 in FIG. 16, or step S1711 in FIG. 17. The third indication of keeping bearers of the SeNB may indicate which specific SeNB bearer is accepted or not.

Figure 23:
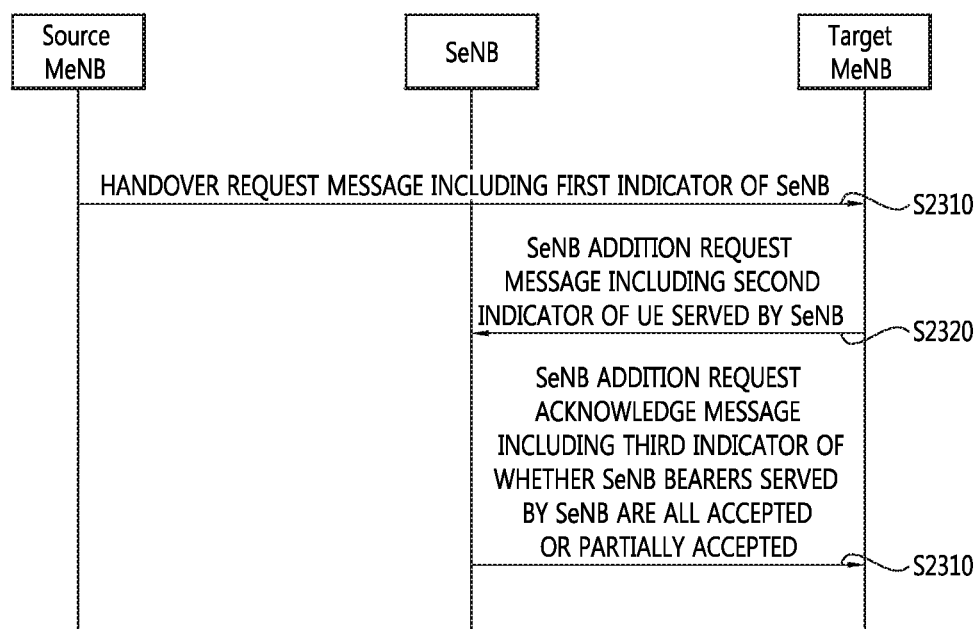
FIG. 23 shows a method for performing an inter-MeNB handover without SeNB change according to an embodiment of the present invention.

FIG. 23 shows a method for performing an inter-MeNB handover without SeNB change according to an embodiment of the present invention. A UE is connected to both the source MeNB and the SeNB currently, and the UE is to be handed over to the target MeNB by the handover procedure without change of the SeNB.

In step S2300, the source MeNB transmits a handover request message including a first indicator of the SeNB to the target MeNB. Step S2300 may correspond to step S1500 in FIG. 15, step S1600 in FIG. 16, step S1700 in FIG. 17, step S2100 in FIG. 21, or step S2200 in FIG. 22. That is, the handover request message may follow Table 5 described above. The first indicator of the SeNB corresponds to a SeNB ID. Or, the first indicator of the SeNB may correspond to a list of candidate SeNB IDs. Further, the first indicator of the SeNB may correspond to a SeNB UE X2AP ID, which was allocated by the SeNB. The SeNB UE X2AP ID may be allocated by the SeNB before the handover procedure is triggered.

In step S2310, the target MeNB transmits a SeNB addition request message including a second indicator of a UE, served by the SeNB, to the SeNB. Step S2310 may correspond to step S1510 in FIG. 15, step S1610 in FIG. 16, step S1710 in FIG. 17, or step S2210 in FIG. 22. That is, the SeNB addition request message may follow Table 6 described above. The second indicator of the UE may correspond to an old SeNB UE X2AP ID, which was allocated by the SeNB.

In step S2320, the SeNB transmits a SeNB addition acknowledge message including a third indicator of whether bearers of the SeNB are all accepted or partially accepted to the target MeNB. The SeNB addition acknowledge message may correspond to step S1511 in FIG. 15, step S1611 in FIG. 16, or step S1711 in FIG. 17.

Figure 24:
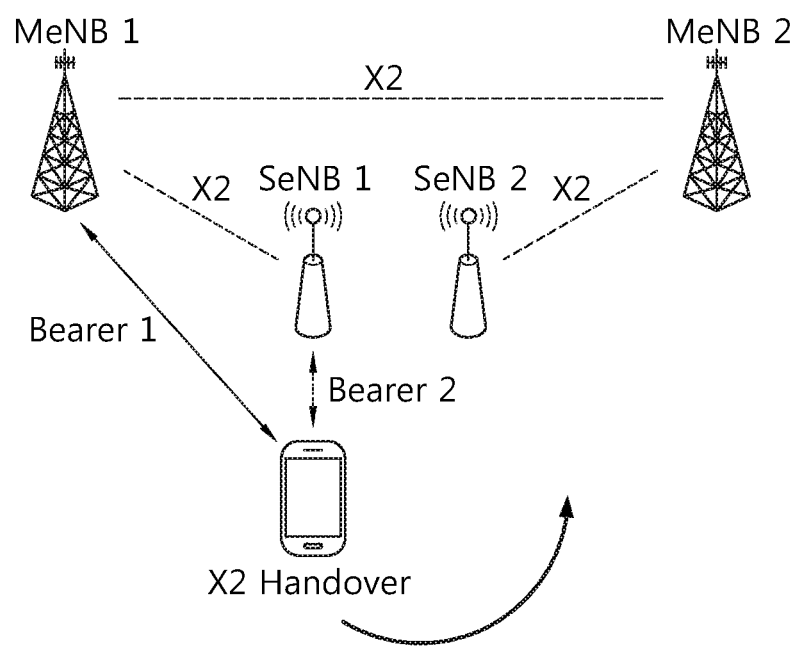
FIG. 24 shows an example of a deployment scenario with two SeNBs and two MeNBs.

FIG. 24 shows an example of a deployment scenario with two SeNBs and two MeNBs. Referring to FIG. 24, SeNB 1 belongs to MeNB 1, and SeNB 2 belongs to MeNB 2. A UE is receiving dual connectivity service via bearer 1 from MeNB 1, and via bearer 2 from SeNB 1. The UE may be handed over to the neighbor MeNB, i.e. MeNB 2. If the current X2 handover procedure shown in FIG. 11 and the current SeNB addition procedure shown in FIG. 12 are applied to the deployment scenario shown in FIG. 24, it is not optimized since the target MeNB has to add the SeNB again after X2 handover procedure. In this way, the path switch message to the MME and RRC signaling to the UE have to be transmitted twice.

Figure 25:
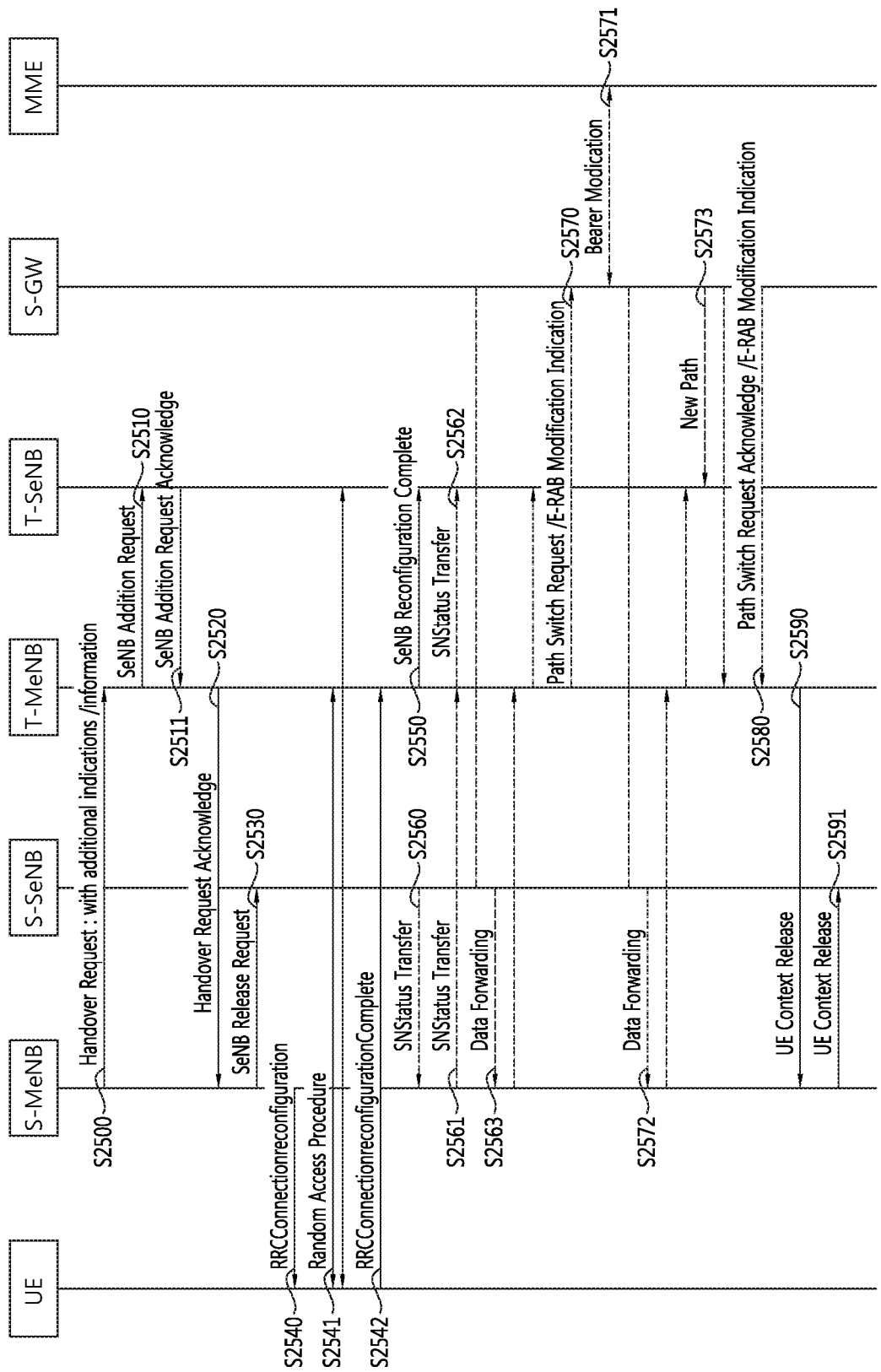
FIG. 25 shows a method for performing an inter-MeNB handover according to an embodiment of the present invention.

FIG. 25 shows a method for performing an inter-MeNB handover according to an embodiment of the present invention. This embodiment is to solve the problem described in the deployment scenario in FIG. 24. In this embodiment, direction addition to the neighbor SeNB during the handover may be assumed. At first, the UE may transmit the measurement report to the source MeNB, which makes a handover decision to the target MeNB for the UE.

In step S2500, the source MeNB transmits the Handover Request message, which includes a first indicator, to target MeNB. The first indicator may be indication of SeNB bearers and/or MeNB bearers. By the first indicator, the target MeNB may differentiate the E-RABs To Be Setup List for the SeNB (i.e. SeNB bearers) and the E-RABs To Be Setup List for the MeNB (i.e. MeNB bearers). Further, the first indicator may be an indicator of the SeNB to indicate the target MeNB to add directly. In this case, the first indicator may be a SeNB (cell) ID. Or, the first indicator may be a list of potential candidate SeNBs for the target MeNB to select. Further, the Handover Request message may include assistant information, i.e. measurement information, for the target MeNB to select the target SeNB. The measurement information may be contained in an independent IE in the Handover Request message. For example, the measurement information may be contained in MeNB to SeNB Container including SCG-ConfigInfo, as measResult-ServCellListSCG indicating measurement results of SCG (serving) cells. Or, the measurement information may be contained in RRC Context IE in the Handover Request Message. The Handover Request message may follow Table 5 described above.

Upon receiving the Handover Request message including the first indicator, the target MeNB may know that the SeNB service/bearer may be added directly. Then, in step S2510, the target MeNB transmits the SeNB Addition Request message, which includes a second indicator, to the target SeNB. The second indicator may indicate the target SeNB bearers for the SeNB. The second indicator may further include the updated security key, generated by the target MeNB, for the SeNB bearers.

In step S2511, the target SeNB gives a response with the SeNB Addition Request Acknowledge message, which includes a third indicator. The third indicator may indicate whether the SeNB bearers are all accepted or partially accepted. That is, the third indicator may indicate information on which specific SeNB bearer is accepted and which specific SeNB bearer is not accepted. For the SeNB bearers not accepted by the SeNB, the target MeNB may accept the rejected SeNB bearer and put in the accepted MeNB bearers list, which is described in step S2520 below.

In step S2520, the target MeNB transmit the Handover Request Acknowledge message, which includes a fourth indicator, to the source MeNB. The fourth indicator may be indication of SeNB bearers and/or MeNB bearers. The fourth indicator may indicate the accepted SeNB bearers and/or rejected SeNB bearers, which are the SeNB bearers within the requested list. The fourth indicator may further indicate the accepted MeNB bearers and/or rejected MeNB bearers. As described above, if the rejected SeNB bearer exists, the accepted MeNB bearers may include the rejected SeNB bearer. The fourth indicator may further indicate direct data forwarding or indirect data forwarding.

In step S2530, the source MeNB may transmit the SeNB Release Request message to the source SeNB. The SeNB Release Request message may include a fifth indicator. The fifth indicator may indicate that each SeNB bearer is to be handed over to the target MeNB and target SeNB. The fifth indicator may further indicate direct data forwarding or indirect data forwarding.

In step S2540, the source MeNB transmits the RRCConnectionReconfiguration message to the UE with the updated MeNB and SeNB configuration, which may include the target MeNB configuration and/or target SeNB configuration.

In step S2541 and step S2542, the random access may be performed to the target MeNB and target SeNB, and the following will be RRCConnectionReconfigurationComplete message.

In step S2550, the target MeNB transmits the SeNB Reconfiguration Complete message to the target SeNB for confirmation.

In step S2560, the source SeNB may transmit the SN Status Transfer message to the source MeNB for the bearers that data forwarding is needed.

In step S2561 and step S2562, the source MeNB may transmit the SN Status Transfer message to the target MeNB, and partial may be forwarded to the target SeNB.

In step S2563, data forwarding may be initiated for the bearers in steps S2560, S2561 and S2562. Direct data forwarding may also be possible based on the indication.

In step S2570, the target MeNB may transmit the Path Switch Request message or E-RAB Modification Indication message to the MME for bearer path change. The Path Switch Request message or E-RAB Modification Indication message may include an indication of E-RABs to be modified and E-RABs not to be modified. The Path Switch Request message or E-RAB Modification Indication message may further include an indication of E-RABs for the MeNB and E-RABs for the SeNB which keeps the SeNB bearers.

In step S2571, the S-GW and MME may perform bearer modification for bearer information updates by exchanging the Modify Bearer Request/Response messages. The Modify Bearer Request/Response messages may include an indication of bearers to be modified and bearers not to be modified. The Modify Bearer Request/Response messages may further include an indication of E-RABs for the MeNB and E-RABs for the SeNB which keeps the SeNB bearers In step S2572, the end marker may be transmitted. In step S2573, the new packets may be transmitted.

In step S2580, the MME may transmit the Path Switch Request Acknowledge message or E-RAB Modification Confirmation message to the target MeNB for response of bearer path change. The Path Switch Request Acknowledge message or E-RAB Modification Confirmation message may include an indication of E-RABs modified and E-RABs failed to modify. The Path Switch Request Acknowledge message or E-RAB Modification Confirmation message may further include information of MeNB bearers or SeNB bearers.

In step S2590, the target MeNB transmits the UE Context Release message to the source MeNB to release the UE context.

In step S2591, the source MeNB may transmit the UE Context Release message to the source SeNB.

Figure 26:
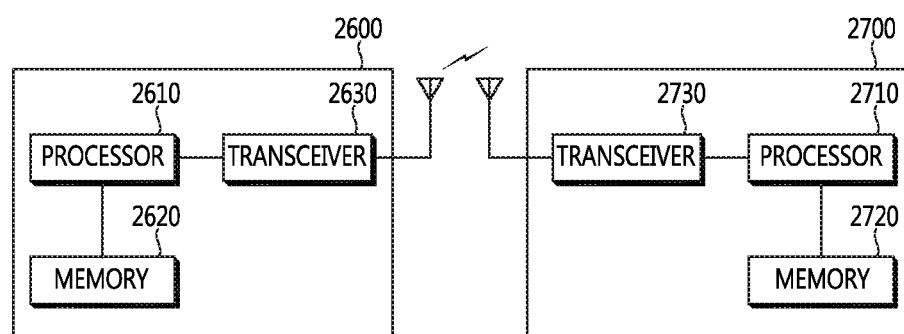
FIG. 26 shows a wireless communication system to implement an embodiment of the present invention.

FIG. 26 shows a wireless communication system to implement an embodiment of the present invention.

A first eNB 800 includes a processor 810, a memory 820, and a transceiver 830. The first eNB 800 may be one of a source/target MeNB or source/target SeNB. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second eNB 900 includes a processor 910, a memory 920 and a transceiver 930. The second eNB 900 may be one of a source/target MeNB or source/target SeNB. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a target master node (MN) in an inter-MN handover procedure, the method comprising:
   receiving a handover request message from a source MN, wherein the handover request message includes an identifier (ID) of a secondary node (SN);
   transmitting a SN addition request message to the SN, wherein the SN addition request message includes an ID of a user equipment (UE), wherein the ID of the UE was allocated by the SN;
   receiving a SN addition request acknowledge message from the SN as a response to the SN addition request message;
   transmitting a handover request acknowledge message to the source MN as a response to the handover request message, wherein the handover request acknowledge message includes information indicating that the SN is kept in the inter-MN handover procedure,
   wherein the UE is currently connected to both the source MN and the SN in dual connectivity.

2. The method of claim 1, wherein the SN addition request message includes an ID of the source MN.

3. The method of claim 1, wherein the SN addition request message includes a security key for the SN.

4. The method of claim 1, wherein the ID of the UE is a SeNB UE X2AP ID.

5. The method of claim 1, wherein the SN addition request acknowledge message includes information on which SN bearers are accepted or not to be kept by the SN for the UE.

6. The method of claim 1, wherein the target MN is a target master eNodeB (MeNB), wherein the source MN is a source MeNB, and wherein the SN is a SeNB.

7. A target master node (MN) in an inter-MN handover procedure, the target MN comprising:
   a memory;
   a transceiver; and
   a processor, operably coupled to the memory and the transceiver, that:
   controls the transceiver to receive a handover request message from a source MN, wherein the handover request message includes an identifier (ID) of a secondary node (SN);
   controls the transceiver to transmit a SN addition request message to the SN, wherein the SN addition request message includes an ID of a user equipment (UE), wherein the ID of the UE was allocated by the SN,
   controls the transceiver to receive a SN addition request acknowledge message from the SN as a response to the SN addition request message;
   controls the transceiver to transmit a handover request acknowledge message to the source MN as a response to the handover request message, wherein the handover request acknowledge message includes information indicating that the SN is kept in the inter-MN handover procedure,
   wherein the UE is currently connected to both the source MN and the SN in dual connectivity.

8. The target MN of claim 7, wherein the SN addition request message includes an ID of the source MN.

9. The target MN of claim 7, wherein the SN addition request message includes a security key for the SN.

10. The target MN of claim 7, wherein the ID of the UE is a SeNB UE X2AP ID.

11. The target MN of claim 7, wherein the SN addition request acknowledge message includes information on which SN bearers are accepted or not to be kept by the SN for the UE.

12. The target MN of claim 7, wherein the target MN is a target master eNodeB (MeNB), wherein the source MN is a source MeNB, and wherein the SN is a SeNB.

* * * * *